(12) United States Patent
Furumoto

(10) Patent No.: US 10,577,202 B2
(45) Date of Patent: Mar. 3, 2020

(54) SHEET FEED DEVICE AND IMAGE FORMING APPARATUS INCLUDING THE SAME

(71) Applicant: Sharp Kabushiki Kaisha, Osaka (JP)

(72) Inventor: Haruhisa Furumoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/415,362

(22) Filed: Jan. 25, 2017

(65) Prior Publication Data

US 2017/0214805 A1 Jul. 27, 2017

(30) Foreign Application Priority Data

Jan. 27, 2016 (JP) .................................. 2016-013246

(51) Int. Cl.
*B65H 1/04* (2006.01)
*B65H 1/26* (2006.01)
*B65H 1/14* (2006.01)

(52) U.S. Cl.
CPC ................ *B65H 1/04* (2013.01); *B65H 1/14* (2013.01); *B65H 1/266* (2013.01); *B65H 2402/441* (2013.01); *B65H 2402/45* (2013.01); *B65H 2405/115* (2013.01); *B65H 2405/1124* (2013.01); *B65H 2405/15* (2013.01); *B65H 2511/11* (2013.01); *G03G 2215/00375* (2013.01)

(58) Field of Classification Search
CPC .... B65H 1/04; B65H 1/266; B65H 2405/324; B65H 2405/112; B65H 2405/1124; B65H 2405/115; B65H 2405/12; B65H 2405/15; B65H 1/08; B65H 1/14; B65H 1/16; B65H 1/18; B65H 2511/11; B65H 3/44
See application file for complete search history.

(56) References Cited

U.S. PATENT DOCUMENTS

| | | | |
|---|---|---|---|
| 9,340,378 B2 | 5/2016 | Ueyama et al. | |
| 2012/0161381 A1 | 6/2012 | Nakamura | |
| 2016/0147188 A1* | 5/2016 | Yamamoto | B65H 1/266 271/171 |
| 2016/0221771 A1* | 8/2016 | Matsushima | B65H 1/266 |
| 2016/0244285 A1* | 8/2016 | Yamamoto | B65H 1/04 |

FOREIGN PATENT DOCUMENTS

| | | |
|---|---|---|
| CN | 103365146 | 10/2013 |
| JP | S57-139945 | 9/1982 |
| JP | 63022434 A * | 1/1988 |
| JP | 01017723 A * | 1/1989 |

(Continued)

*Primary Examiner* — Luis A Gonzalez
(74) *Attorney, Agent, or Firm* — Renner, Otto, Boiselle & Sklar, LLP

(57) ABSTRACT

A sheet feed device includes: a stacking tray on which sheets are stacked in such a manner as to be capable of being lifted and lowered; and a position restricting member configured to come into contact with a sheet end portion to restrict a position of the sheets. The position restricting member is provided to an opening/closing member capable of being opened and closed. When the opening/closing member is closed, the position restricting member restricts a position of the sheet end portion in an opening/closing direction of the opening/closing member.

10 Claims, 14 Drawing Sheets

(56) References Cited

FOREIGN PATENT DOCUMENTS

| JP | 02-243425 | | | 9/1990 |
|----|-----------|---|---|--------|
| JP | H2-135541 | | | 11/1990 |
| JP | 03177240 | A | * | 8/1991 |
| JP | 2003040463 | A | * | 2/2003 |
| JP | 2009155006 | A | * | 7/2009 |
| JP | 2012131630 | | | 7/2012 |
| JP | 2014061962 | A | * | 4/2014 |

* cited by examiner (a)

(b)

(a)

(b)

(a)

(b)

(a)

(b)

SHEET FEED DEVICE AND IMAGE FORMING APPARATUS INCLUDING THE SAME

CROSS-REFERENCE TO RELATED APPLICATIONS

The present application claims the benefit of priority to Japanese Patent Application No. 2016-013246, the entirety of which is incorporated herein by reference, filed on Jan. 27, 2016 under Section 119 (a) of 35 U.S.C.

BACKGROUND ART

Field of the Invention

The present invention relates to a sheet feed device that feeds a sheet, such as a recording sheet, in a predetermined sheet feed direction, and an image forming apparatus, such as a copier, a multifunction peripheral, a printer, or a FAX machine, including the same.

Description of the Related Art

One conventionally known sheet feed device (what is known as a sheet feeder) that feeds a sheet, such as a recording sheet, in a predetermined sheet feed direction includes: a stacking tray on which sheets, such as recording sheets, are stacked in a liftable manner; and an openable cover that can be opened and closed to cover the stacking tray (for example, Japanese Unexamined Patent Application Publication No. 2-243425).

For example, when the sheet feed device no longer includes the sheets on the stacking tray, a user performs a sheet supplying operation for supplying the sheets, with the openable cover open.

Such a conventional sheet feed device includes a positioning member that positions sheets stacked on the stacking tray. The openable cover is openable and closable around a rotational axis along a positioning direction in which the sheets are positioned by the positioning member. When the openable cover is open, sheet supplying is hindered by an uppermost portion of the openable cover in the open state in an upper and lower direction, and thus the operability of the sheet supplying operation for supplying sheets is compromised.

SUMMARY OF THE INVENTION

The present invention provides a sheet feed device that includes a stacking tray on which sheets are stacked and an openable cover that can be opened and closed to cover the stacking tray, and can achieve a higher operability of a sheet supplying operation for supplying sheets, and provides an image forming apparatus including the same.

A sheet feed device according to one aspect of the present invention includes: a stacking tray on which sheets are stacked in such a manner as to be capable of being lifted and lowered; and a position restricting member configured to restrict a position of the sheets. The position restricting member is provided to an opening/closing member capable of being opened and closed. When the opening/closing member is closed, the position restricting member restricts a position of an end portion of the sheets in an opening/closing direction of the opening/closing member.

In such a sheet feed device, the openable cover is provided with the position restricting member. Thus, when the openable cover is opened for supplying sheets, the position restricting member moves together with the openable cover from a portion near the stacking tray. Thus, the sheet supplying operation can be performed with no interference between the position restricting member and the sheets, and thus can be performed with a higher operability.

In one embodiment of the present invention, a casing side member may be provided on a lower portion of the opening/closing member. The position restricting member may include: a first position restricting member provided to the opening/closing member; and a second position restricting member provided to the casing side member.

In one embodiment of the present invention, when the opening/closing member is closed, the first position restricting member and the second position restricting member may be positioned along a stacking direction of the sheets.

In one embodiment of the present invention, when the opening/closing member is closed, the first position restricting member and the second position restricting member may be positioned on a same straight line in a stacking direction of the sheets.

In one embodiment of the present invention, the first position restricting member and the second position restricting member may each include a recess portion or a protruding portion, the recess portion and the protruding portion having matching shapes, and when the opening/closing member is closed, the recess portion or the protruding portion of the first position restricting member may be positioned at the protruding portion or the recess portion of the second position restricting member.

In one embodiment of the present invention, the first position restricting member may include: a first restricting portion configured to restrict a sheet of a first size; and a second restricting portion configured to restrict a sheet of a second size.

In one embodiment of the present invention, the first position restricting member may be detachably attached to the opening/closing member and may have a substantially rectangular parallelepiped shape. The first restricting portion and the second restricting portion may be substantially orthogonal to each other.

In one embodiment of the present invention, the first position restricting member may include: a first attachment position attached to the opening/closing member for restricting the sheet of the first size; and a second attachment position attached to the opening/closing member for restricting the sheet of the second size, and a distance between the first attachment position and the first restricting portion may be different from a distance between the second attachment position and the second restricting portion.

In one embodiment of the present invention, the opening/closing member may include a plurality of engagement portions with which the first position restricting member is attached, the engagement portions being arranged in a width direction of the sheet.

In one embodiment of the present invention, the opening/closing member may be provided with a swinging fulcrum, and an operation of closing the opening/closing member may cause the first position restricting member to be in contact with a trailing end side of the sheet.

In one embodiment of the present invention, when the opening/closing member is opened, the stacking tray may be lowered and stopped at a predetermined position, and when the stacking tray is at the predetermined position, an uppermost portion of the second position restricting member may be positioned lower than an upper surface of the stacking tray or an upper surface of an uppermost one of the stacked sheets.

An image forming apparatus according to an aspect of the present invention includes the sheet feed device with one of the configurations described above.

The present invention can improve the operability of the sheet supplying operation for supplying sheets.

BRIEF DESCRIPTION OF THE DRAWINGS

FIG. 3 is a diagram illustrating a sheet supplying operation on the sheet feed device illustrated in FIG. 1 and FIG. 2, in which FIG. 3A is a schematic perspective view illustrating a state where an openable cover is closed, and FIG. 3B is a schematic cross-sectional view schematically illustrating an internal configuration in a state where the openable cover is closed.

FIG. 4 is a diagram illustrating a sheet supplying operation on the sheet feed device illustrated in FIG. 1 and FIG. 2, in which FIG. 4A is a schematic perspective view illustrating the state where the openable cover is open, and FIG. 4B is a schematic cross-sectional view schematically illustrating an internal configuration in the state where the openable cover is open.

FIG. 5 is a diagram illustrating a sheet supplying operation on the sheet feed device illustrated in FIG. 1 and FIG. 2, in which FIG. 5A is a schematic perspective view illustrating a state where one bundle of sheets is supplied in the state where the openable cover is open, and FIG. 5B is a schematic cross-sectional view schematically illustrating an internal configuration in the state where one bundle of sheets is being supplied with the openable cover open.

FIG. 7 is a perspective view illustrating an outer appearance of an openable cover side position restricting member 222d, in which FIG. 7A is an upper perspective view, and FIG. 7B is a lower perspective view.

FIG. 8 is a perspective view illustrating an outer appearance of a side surface cover side position restricting member 222e, in which FIG. 8A is an upper perspective view, and FIG. 8B is a lower perspective view.

DESCRIPTION OF THE EMBODIMENTS

An embodiment of the present invention is described below with reference to the drawings.

(Overall Configuration of Image Forming Apparatus)

Figure 1:
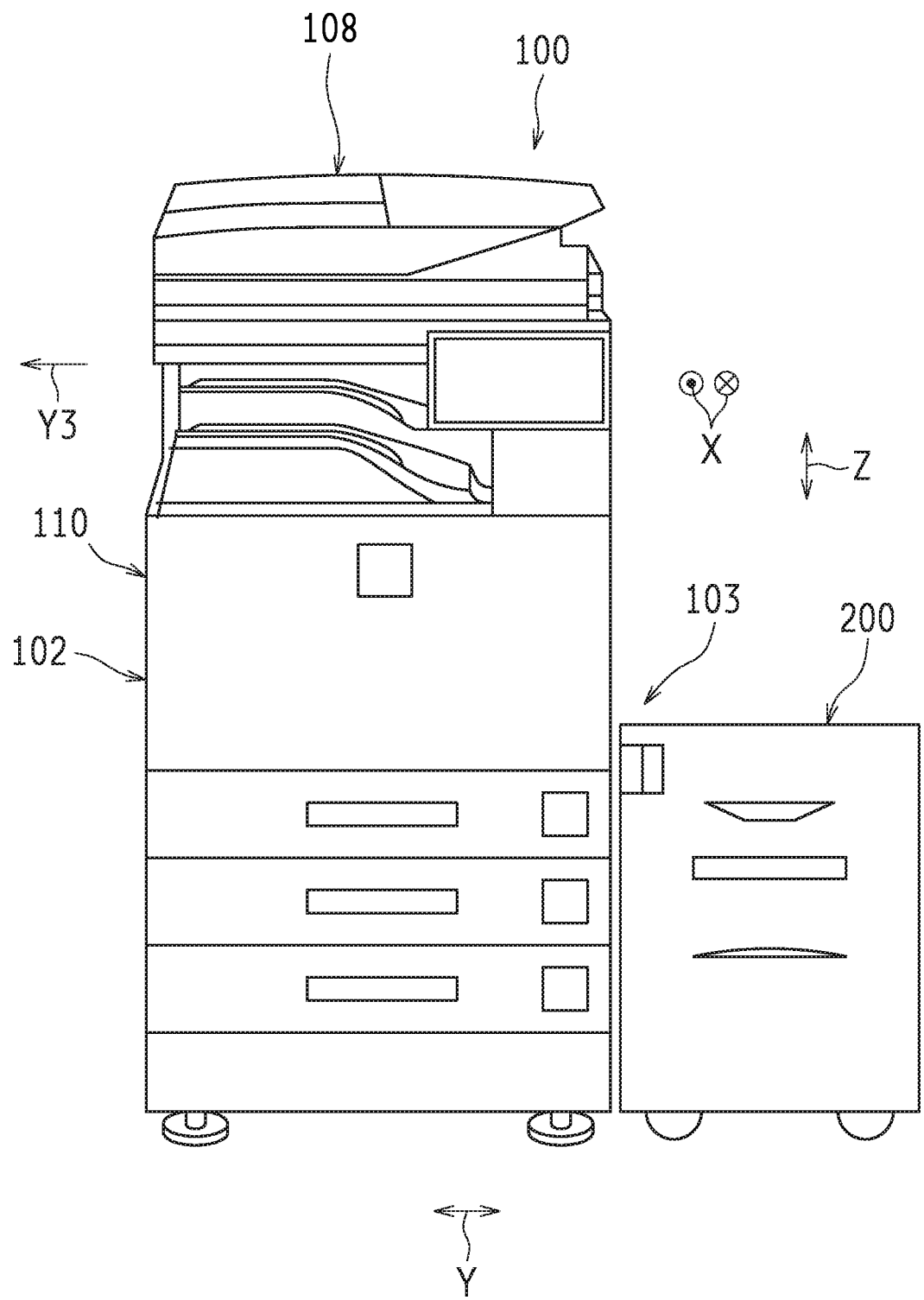
FIG. 1 is a schematic front view of an image forming apparatus including a sheet feed device according to an embodiment.
Figure 2:
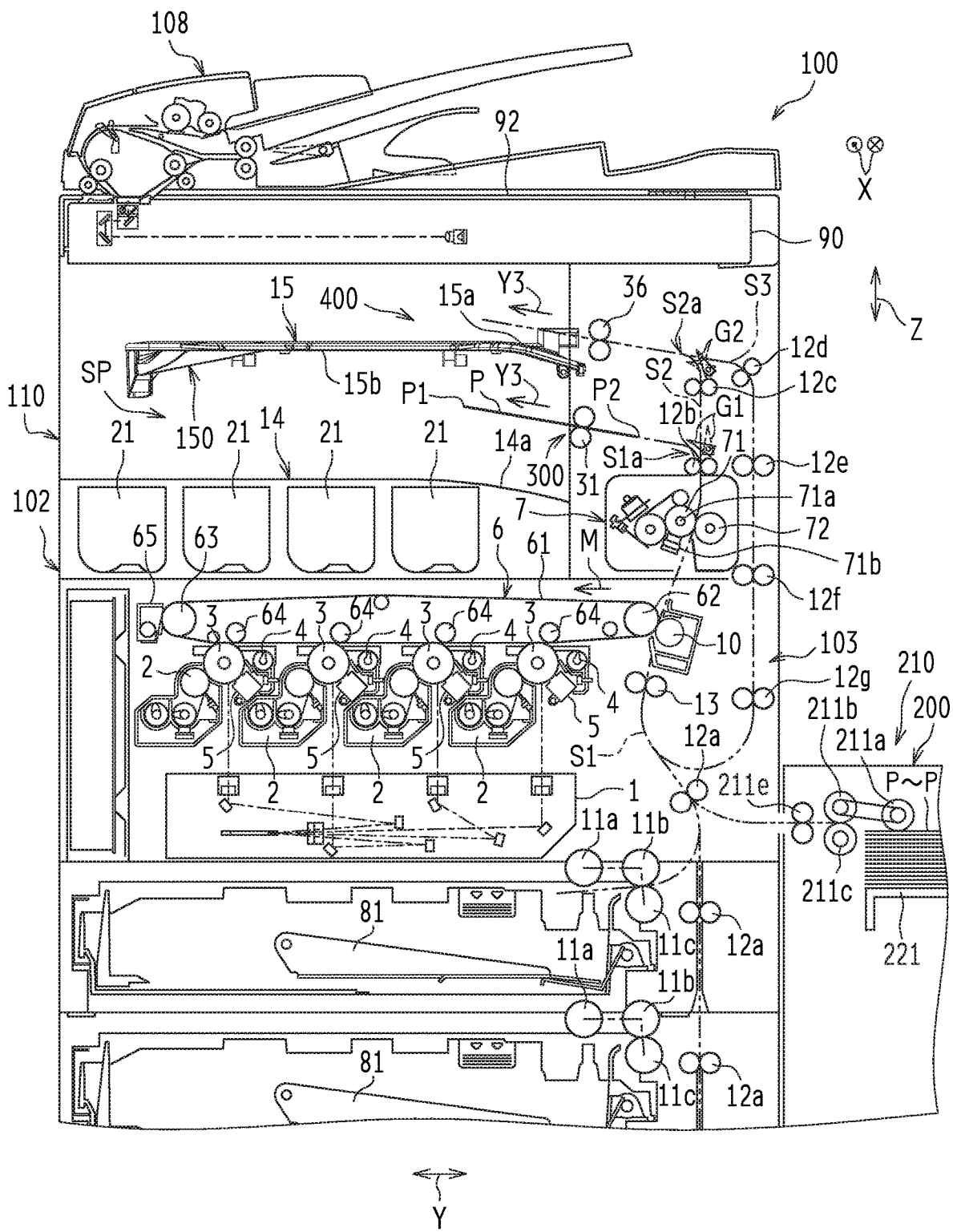
FIG. 2 is a schematic cross-sectional front view of the image forming apparatus according to the present embodiment.

FIG. 1 is a schematic front view of an image forming apparatus 100 including a sheet feed device 200 according to the present embodiment. FIG. 2 is a schematic cross-sectional front view of the image forming apparatus 100 according to the present embodiment.

The image forming apparatus 100 illustrated in FIG. 1 and FIG. 2 is a color image forming apparatus that forms a multicolor or monochrome image on a sheet P (see FIG. 2) such as a recording sheet, in accordance with image data transmitted thereto from the outside. The image forming apparatus 100 includes: a document read apparatus 108; an image forming apparatus main body 110; and the sheet feed device 200 (what is known as a sheet feeder, which is a large capacity sheet feeder in this example) (see FIG. 1). The image forming apparatus main body 110 includes an image forming unit 102 and a sheet conveyance system 103. More specifically, the image forming apparatus 100 is a multifunction peripheral having a copy function, a printer function, and a facsimile function.

As illustrated in FIG. 2, the image forming unit 102 includes an exposing unit 1, a plurality of development units 2 to 2, a plurality of photosensitive drums 3 to 3, a plurality of cleaning units 4 to 4, a plurality of charging units 5 to 5, an intermediate transfer belt unit 6, a plurality of toner cartridge units 21 to 21, and a fixing unit 7.

The sheet conveyance system 103 includes a paper feed tray 81, the sheet feed device 200, a discharge tray 14, and a sheet discharge device 400.

The sheet discharge device 400 includes a sheet sorting unit 300 and an upper discharge tray 15. The sheet sorting unit 300 sorts the sheet P, discharged by discharge rollers 31, by shifting the discharge rollers 31 in an axial direction (shift direction) (depth direction X) of the discharge rollers 31. The discharge rollers 31 convey the sheet P in a predetermined conveyance direction Y3, so that the sheet P is discharged onto the discharge tray 14. The upper discharge tray 15 is disposed above the discharge tray 14 with a space SP in between. The discharge tray 14 may be a component of the sheet discharge device 400.

A platen 92 made of a transparent glass piece, on which a document (not illustrated) is placed, is provided in an upper portion of the image forming apparatus main body 110. An optical unit 90 that reads the document is disposed below the platen 92. The document read apparatus 108 is disposed on an upper side of the platen 92. The document read apparatus 108 automatically conveys the document onto the platen 92. The document read apparatus 108 is rotatably attached to the image forming apparatus main body 110. Thus, a front side can be opened to open a space on the platen 92 to enable manual placement of the document.

The document read apparatus 108 can read a document automatically conveyed thereto, and a document placed on the platen 92. An image of the document read by the document read apparatus 108 is transmitted as image data to the image forming apparatus main body 110 of the image forming apparatus 100. In the image forming apparatus main body 110, an image formed based on the image data is recorded on the sheet P.

The image data used in the image forming apparatus 100 corresponds to a color image using a plurality of colors (in this example, colors black (K), cyan (C), magenta (M), and yellow (Y)). Thus, a plurality of sets (in this example, four sets corresponding to black, cyan, magenta, and yellow) of the development units 2 to 2, the photosensitive drums 3 to 3, the cleaning units 4 to 4, the charging units 5 to 5, and the toner cartridge units 21 to 21 are provided to form a plurality of types of (in this example, four types) images corresponding to the colors. Thus, a plurality of (in this example, four) image stations are provided.

The charging units 5 to 5 uniformly charge surfaces of the photosensitive drums 3 to 3 to achieve a predetermined potential. The exposing unit 1 exposes each of the charged photosensitive drums 3 to 3 in accordance with the image data input, so that electrostatic latent images corresponding to the image data are formed on the surfaces of the photosensitive drums 3 to 3. The toner cartridge units 21 to 21 contain toner to be supplied to developer tanks of the development units 2 to 2. The development units 2 to 2 develop the electrostatic latent image formed on the photosensitive drums 3 to 3 with the toner of four colors (Y, M, C, and K). The cleaning units 4 to 4 remove and collect the toner remaining on the surfaces of the photosensitive drums 3 to 3, after the developing and image transferring.

The intermediate transfer belt unit 6 disposed above the photosensitive drums 3 to 3 includes: an intermediate transfer belt 61 serving as an intermediate transfer member; an intermediate transfer belt driving roller 62; an intermediate transfer belt driven roller 63; a plurality of intermediate transfer rollers 64 to 64; and an intermediate transfer belt cleaning unit 65.

Four intermediate transfer rollers 64 to 64 corresponding to the colors Y, M, C, and K are provided. The intermediate transfer belt 61 is spanned by the intermediate transfer belt driving roller 62, the intermediate transfer belt driven roller 63, and the intermediate transfer rollers 64 to 64. When the intermediate transfer belt driving roller 62 is drivingly rotated, the intermediate transfer belt 61 is rotationally moved in a movement direction M, and the intermediate transfer belt driven roller 63 and the intermediate transfer rollers 64 to 64 are driven to be rotated. Transfer bias, for transferring the toner images, formed on the photosensitive drums 3 to 3, onto the intermediate transfer belt 61, is applied to the intermediate transfer rollers 64 to 64. The intermediate transfer belt 61 is provided to be in contact with the photosensitive drums 3 to 3. The toner images of the corresponding colors formed on the photosensitive drums 3 to 3 are transferred onto a surface of the intermediate transfer belt 61 in an overlapping manner. Thus, a color toner image (multicolor toner image) is formed on the surface. The toner image on the intermediate transfer belt 61 is transferred onto the sheet P by a transfer roller 10. The toner remaining on the intermediate transfer belt 61 without being transferred onto the sheet P is removed and collected by the intermediate transfer belt cleaning unit 65.

One or a plurality of stages (three stages in this example) of the paper feed trays 81 are disposed below the exposing unit 1 in the image forming apparatus main body 110, and each accommodate the sheet P on which the image is to be formed (printed) through the process described above. In the sheet feed device 200, the sheets P on which the image is to be formed (printed) are accommodated while being stacked on a stacking tray 221. In this example, the sheet feed device 200 is a large capacity sheet feeder that accommodates a large amount of (for example at least 1000 sheets) sheets P. For example, the large capacity sheet feeder is referred to as a large capacity sheet feed cassette or a large capacity paper feed tray. The sheet feed device 200 is described in detail later.

The discharge tray 14 is disposed above the image forming unit 102 in the image forming apparatus main body 110. The sheets P on which the image has been formed (printed) are stacked face down on the discharge tray 14. The discharge tray 14 has a configuration in which an upstream side of a placement surface 14a, on which the sheet P is placed, is positioned lower than a downstream side in the conveyance direction Y3 of the sheet P. The discharge tray 14 is not limited to this. In this example, a sheet P for copying on which an image has been formed (printed) with the copy function, and a sheet P for printing on which an image has been formed (printed) with the printer function are discharged onto the discharge tray 14. The sheet P for copying and the sheet P for printing are sorted by the sheet sorting unit 300 and then are discharged onto the discharge tray 14.

The upper discharge tray 15 is disposed above the discharge tray 14 with the space SP in between, in the image forming unit 102 of the image forming apparatus main body 110. The sheets P on which the image has been formed (printed) are stacked face down on the upper discharge tray 15. The upper discharge tray 15 has a configuration similar to that of the discharge tray 14. More specifically, a placement surface 15a, on which the sheet P is placed, has an upstream side positioned lower than a downstream side in the conveyance direction Y3 of the sheet P. In this example, the sheet P for facsimile on which an image has been formed (printed) with the facsimile function is discharged onto the upper discharge tray 15. However, this should not be construed in a limiting sense.

The image forming apparatus main body 110 is provided with a sheet conveyance path S1 and an upper sheet conveyance path S2. In the sheet conveyance path S1, the sheet P transmitted from the paper feed trays 81 to 81 or the sheet feed device 200 is guided to the discharge tray 14 via the transfer roller 10 and the fixing unit 7. The upper sheet conveyance path S2, through which the sheet P is guided to the upper discharge tray 15, is branched upward from a branching portion S1a at a position between the fixing unit 7 and the discharge roller 31 of the sheet conveyance path S1. Pickup rollers 11a to 11a and 211a, a pair of feed rollers (11b, 11c) to (11b, 11c) and (211b, 211c), a plurality of conveyance rollers 12a to 12a and 12b, a registration roller 13, the transfer roller 10, a heat roller 71 and a pressure roller 72 in the fixing unit 7, and the discharge roller 31 are disposed near the sheet conveyance path S1.

An upper conveyance roller 12c and an upper discharge roller 36 are disposed near the upper sheet conveyance path S2. A branching claw G1 is disposed near the branching portion S1a. The branching claw G1 takes a first switch posture (a posture illustrated with a solid line in FIG. 2) with which the sheet P from the fixing unit 7 is guided to the discharge roller 31, and a second switch posture (a posture illustrated with a dotted line in FIG. 2) with which the sheet P from the fixing unit 7 is guided to the upper sheet conveyance path S2.

The upper discharge roller 36 rotates in a normal direction for discharging the sheet P onto the upper discharge tray 15 and rotates in a reverse direction for conveying the sheet P toward the opposite side of the conveyance direction Y3 (what is known as switchback). The image forming apparatus main body 110 is provided with a reversing sheet conveyance path S3 in which the sheet P from an upper branching portion S2a at an intermediate portion of the upper sheet conveyance path S2 is guided toward an upstream side of the registration roller 13 on the sheet conveyance path S1 while being reversed.

A plurality of (four in this example) reversing conveyance rollers 12d to 12g are disposed near the reversing sheet conveyance path S3. An upper branching claw G2 is disposed near the upper branching portion S2a. The upper branching claw G2 takes a first switched posture (a posture illustrated with a solid line in FIG. 2) with which the sheet P from the branching portion S1a is guided to the upper discharge roller 36, and a second switched posture (a posture illustrated with a dotted line in FIG. 2) with which the sheet P switched back from the upper discharge roller 36 is guided to the reversing sheet conveyance path S3.

The conveyance rollers 12a to 12a, and 12b, disposed along the sheet conveyance path S1, the upper conveyance roller 12c, disposed along the upper sheet conveyance path S2, and the reversing conveyance rollers 12d to 12g, disposed along the reversing sheet conveyance path S3, are small rollers facilitating and supporting the conveyance of the sheet P.

The pickup rollers 11a to 11a for the paper feed tray 81 are disposed near a sheet feed side of the paper feed trays 81 to 81, pick up the sheets P one by one from the paper feed trays 81 to 81, and feed the sheet P to the sheet conveyance path S1. The pair of feed rollers 11b to 11b and 11c to 11c feed the sheet P, transmitted thereto from the pickup rollers 11a to 11a, toward the sheet conveyance path S1.

Similarly, the pickup roller 211a in a sheet feed unit 210 of the sheet feed device 200 is disposed near a sheet feed side of the sheet feed device 200, picks up the sheets P one by one from the sheet feed device 200, and feeds the sheet P to the sheet conveyance path S1. The pair of feed rollers 211b and 211c feed the sheet P, transmitted thereto from the pickup roller 211a, toward the sheet conveyance path S1.

The registration roller 13 temporarily holds the sheet P, transmitted to the sheet conveyance path S1. Then, the registration roller 13 conveys the sheet P to a transfer nip portion between the transfer roller 10 and the intermediate transfer belt 61 in such a timing that leading edges of the toner images on the photosensitive drums 3 to 3 and a downstream side end (leading edge P1) of the sheet P in the conveyance direction Y3 match.

The fixing unit 7 fixes the unfixed toner image on the sheet P, and includes the heat roller 71 and the pressure roller 72 that serve as fixing rollers. The heat roller 71 is drivingly rotated to convey the sheet P nipped between the heat roller 71 and the pressure roller 72 that is driven to be rotated by the rotation of the heat roller 71. The heat roller 71 is heated by a heater 71a disposed on an inner side, and is maintained to be at a predetermined fixing temperature based on a signal from a temperature detector 71b. The heat roller 71 heated by the heater 71a cooperates with the pressure roller 72 to thermally press the multicolor toner image, which has been transferred on the sheet P, against the sheet P. Thus, the multicolor toner image is melted, mixed, and pressed and thus is thermally fixed on the sheet P.

Components with reference numerals not described with reference to FIG. 2 will be described later.

(Sheet Feed Device)

Next, the sheet feed device 200 illustrated in FIG. 1 and FIG. 2 is described below with reference to FIG. 3 to FIG. 5.

Figure 3:
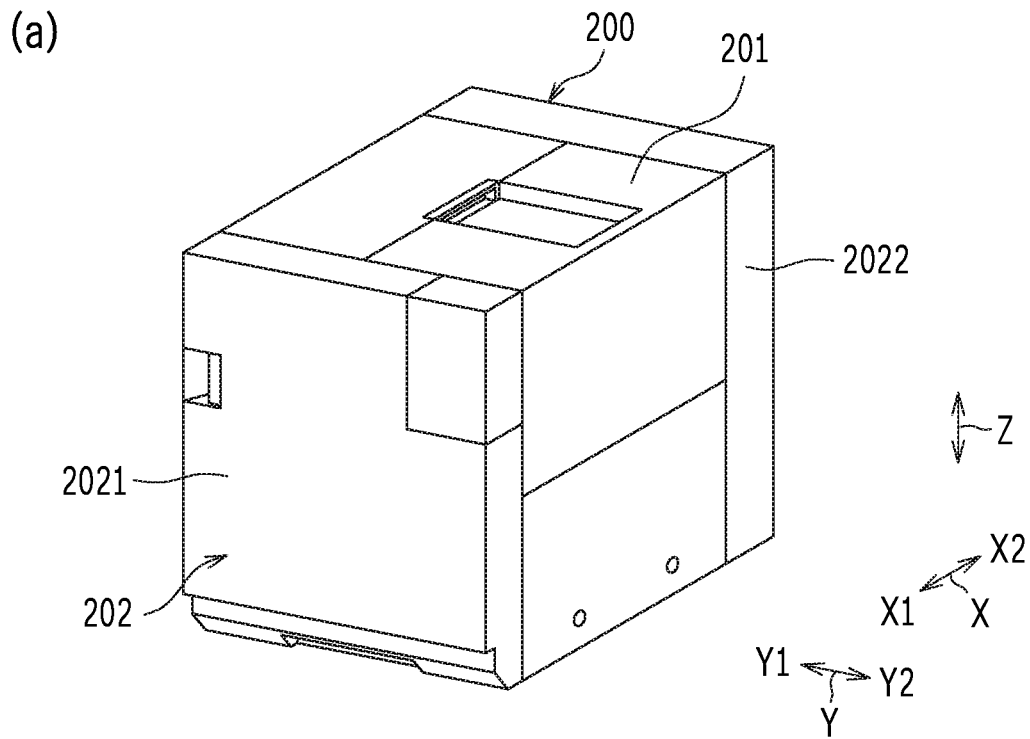
Figure 3:
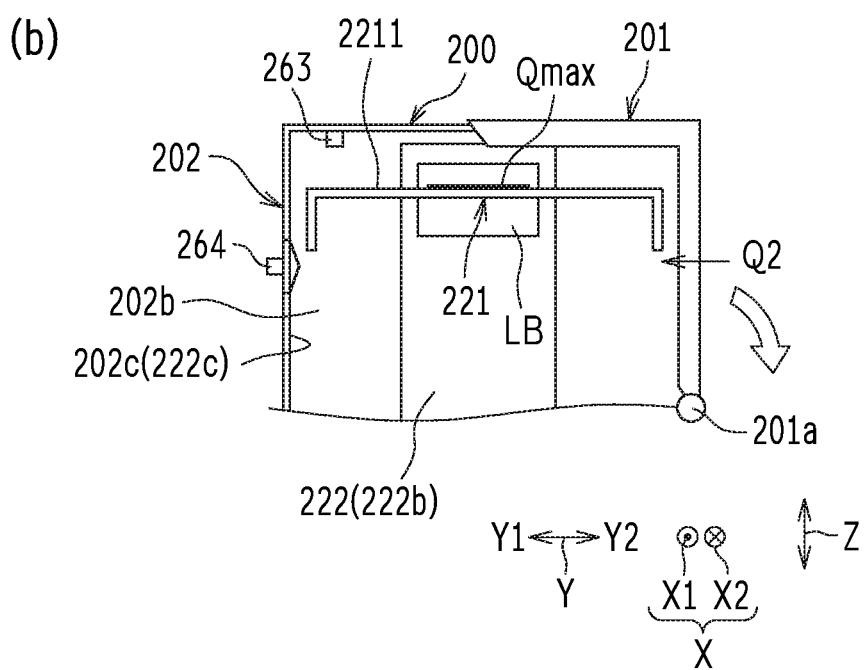
Figure 4:
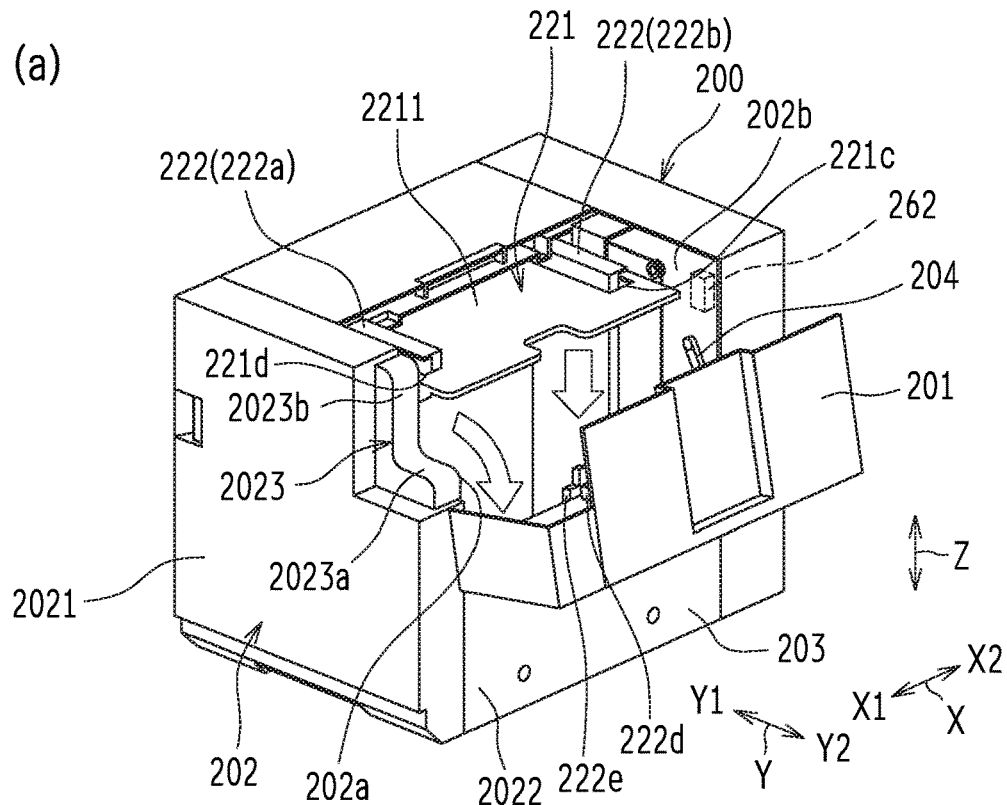
Figure 4:
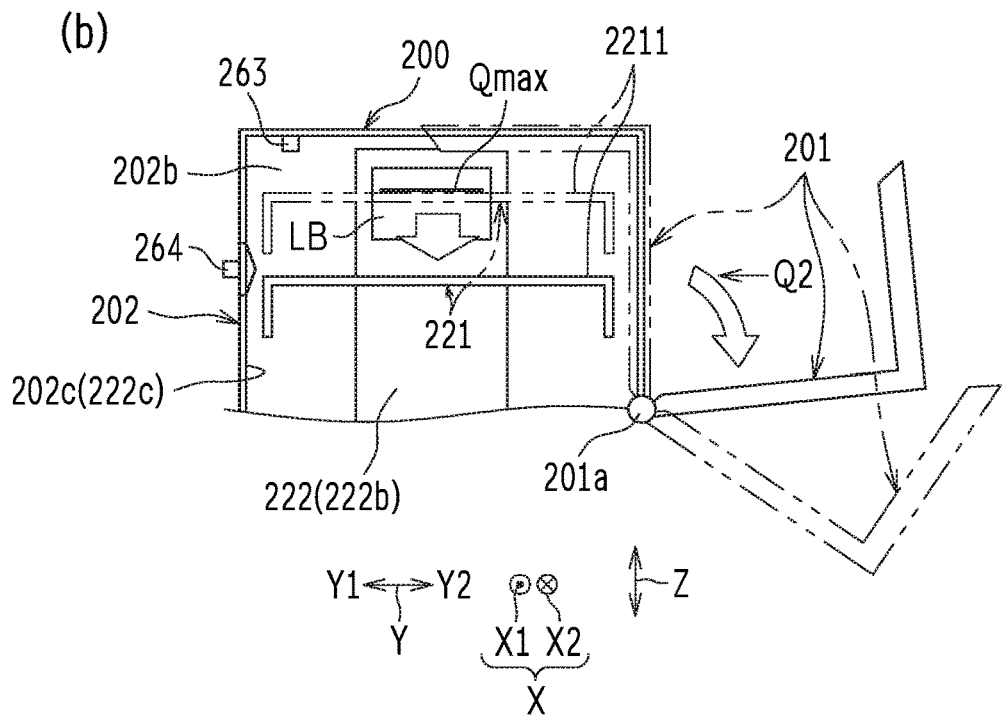
Figure 5:
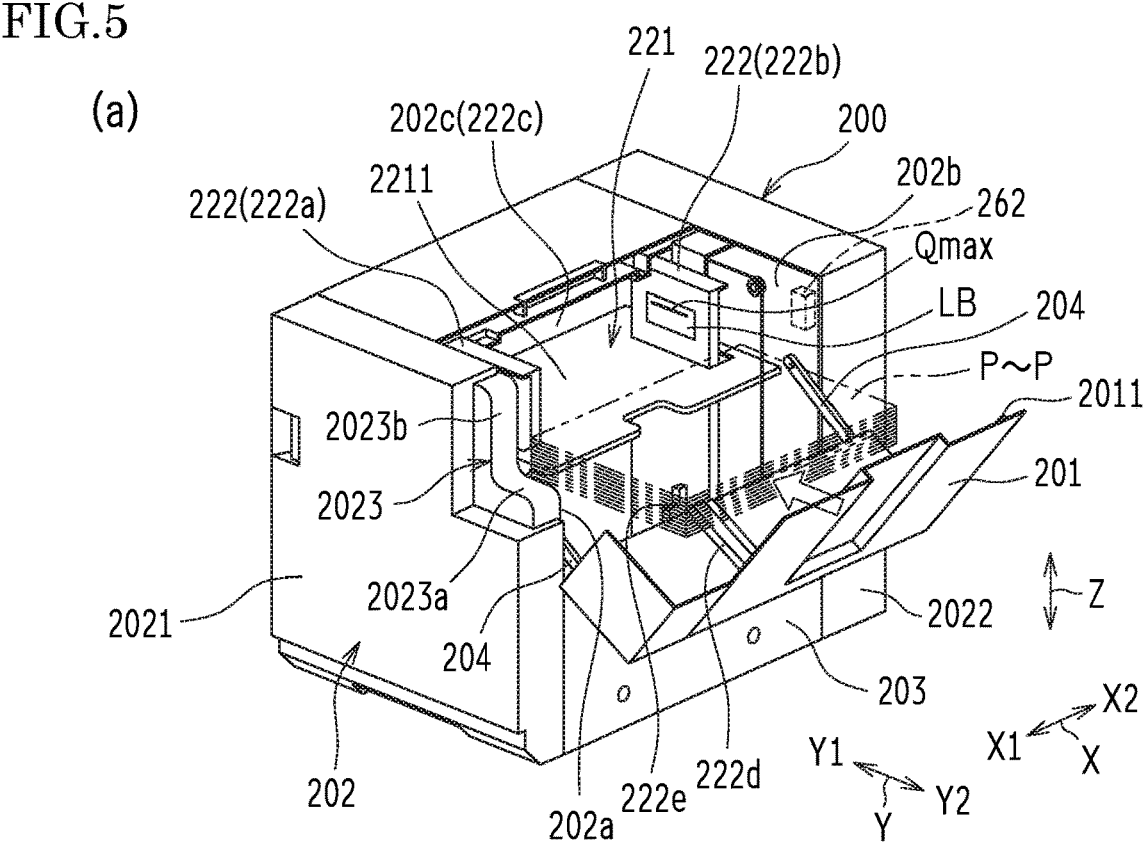
Figure 5:
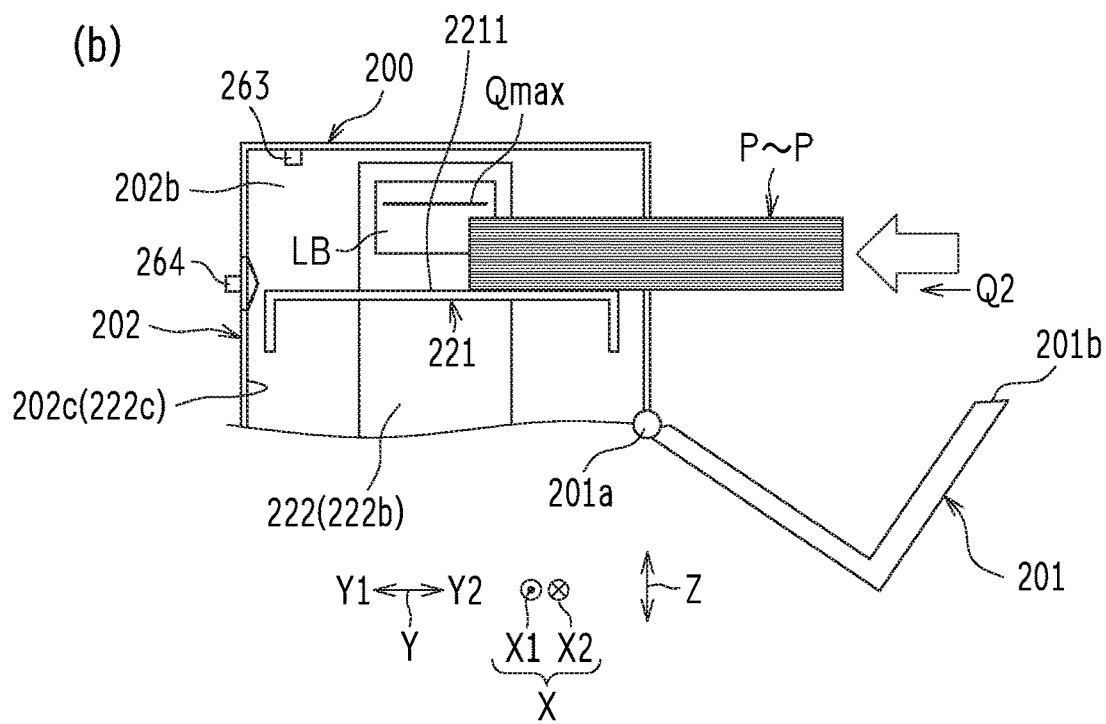

FIG. 3 to FIG. 5 are each a diagram illustrating a sheet supplying operation on the sheet feed device 200 illustrated in FIG. 1 and FIG. 2. FIG. 3A is a schematic perspective view illustrating a state where an openable cover 201 is closed. FIG. 3B is a schematic cross-sectional view schematically illustrating an internal configuration in the state where the openable cover 201 is closed. FIG. 4A is a schematic perspective view illustrating a state where the openable cover 201 is open. FIG. 4B is a schematic cross-sectional view schematically illustrating an internal configuration in the state where the openable cover 201 is open. FIG. 5A is a schematic perspective view illustrating a state where one bundle (a bundle of 500 sheets for example) of sheets P to P is supplied in the state where the openable cover 201 is open. FIG. 5B is a schematic cross-sectional view schematically illustrating an internal configuration in the state where the one bundle of sheets P to P is being supplied with the openable cover 201 open.

(Stacking Tray)

The stacking tray 221, on which the sheets P to P are stacked, is provided in the casing 202 in a liftable manner.

More specifically, the stacking tray 221 is provided in the casing 202 of the sheet feed device 200 in such a manner as to be movable back and forth along an upper and lower direction Z. The stacking tray 221 is a plate-shaped member extending along both predetermined depth direction X and left and right direction Y. The stacking tray 221 is a rectangular member with a longitudinal side extending in the depth direction X in plane view. The depth direction X is a direction between a front side (forward side, operation side) and a back side (rear side, side opposite to the operation side) of the sheet feed device 200. The left and right direction Y is orthogonal to both the depth direction X and the upper and lower direction Z. In this example, the depth direction X is orthogonal to a sheet feed direction Y1 of the sheets P to P stacked on the stacking tray 221, and extends along the sheet surface of the sheets P to P. The left and right direction Y extends along the sheet feed direction Y1 of the sheets P to P stacked on the stacking tray 221.

(Casing)

The casing 202 accommodates the stacking tray 221 in a liftable manner. The casing 202 has a front surface 2021 (see FIG. 3A, FIG. 4A, and FIG. 5A) as a predetermined surface in a direction orthogonal to the upper and lower direction Z (on one side in the depth direction X in this example). The sheets P to P are supplied from one side in the left and right direction Y, with respect to the front surface 2021 of the casing 202 (a side of an opposite direction Y2 with respect to the sheet feed direction Y1), that is, from a right side surface 2022 in this example (see FIG. 3A, FIG. 4A, and FIG. 5A).

More specifically, the casing 202 includes: a pair of inner walls 202a and 202b (see FIG. 3B, FIG. 4, FIG. 5, FIG. 8, and FIG. 9) arranged along both the left and right direction Y and the upper and lower direction Z with a predetermined distance provided in between; and a side wall 202c (FIG. 3B, FIG. 4B, FIG. 5, FIG. 8, and FIG. 9) provided on a feed side of the sheet P of the pair of inner walls 202a and 202b while extending along both the depth direction X and the upper and lower direction Z. The stacking tray 221 includes: a pair of sliding members 221a and 221a (see FIG. 6) that are provided on both ends in the depth direction X and slide on the pair of inner walls 202a and 202b of the casing 202, during the back and forth movement along the upper and lower direction Z; and a plurality of (two in this example) sliding members 221b to 221b (see FIG. 6) that are provided on one end on the feed side of the sheet P in the left and right direction Y, and slide on the side wall 202c of the casing 202, during the back and forth movement in the upper and lower direction Z. Thus, the stacking tray 221 can stably move back and forth along the upper and lower direction Z, with respect to the casing 202.

(Positioning Member)

The positioning member 222 positions the sheets P to P stacked on the stacking tray 221.

More specifically, the positioning member 222 includes a front side positioning member 222a (see FIG. 4A and FIG. 5A) and a back side positioning member 222b (see FIG. 3B, FIG. 4, and FIG. 5).

The front side positioning member 222a and the back side positioning member 222b position the sheets P to P, through restriction of movement of the sheets P to P, stacked on the stacking tray 221, toward a front side X1 and a back side X2 opposite to the front side X1.

The front side positioning member 222a and the back side positioning member 222b stand from a bottom surface 202d of the casing 202 to extend in both the left and right direction Y and the upper and lower direction Z, while being separated from each other in the depth direction X by a predetermined distance (distance slight larger than the size of the sheet P in the depth direction X, due to a predetermined gap).

In this example, with the front side positioning member 222a and the back side positioning member 222b, the positioning position, in the depth direction X, can be adjusted for the sheet P of various sizes (more specifically, a A4 size, a letter size, and a B5 size).

More specifically, the casing 202 of the sheet feed device 200 is provided with fixing screw holes (not illustrated) and fixing engagement portions (for example, engagement protrusions), for fixing the front side positioning member 222a and the back side positioning member 222b, arranged along the upper and lower direction Z. The front side positioning member 222a and the back side positioning member 222b are provided with a plurality of fixing screw through holes (not illustrated) that corresponding to the various sizes and are arranged in the depth direction X and fixing engagement portions (for example, engagement holes) (not illustrated) that are arranged in the upper and lower direction Z. A fixing screw (not illustrated) is inserted in the fixing screw through hole corresponding to the size of the sheet P to be placed and screwed in the fixing screw hole, with the fixing screw through holes matching or substantially matching the fixing screw holes and with the fixing engagement portion (for example, the engagement hole) corresponding to the size of the sheet P to be placed engaged with the fixing engagement portion (for example, the engagement protrusion). In this manner, the positioning position in the depth direction X can be adjusted with the front side positioning member 222a and the back side positioning member 222b, in accordance with the size of the sheet P in the depth direction X.

The positioning member 222 further includes a feed side positioning member 222c (see FIG. 3B, FIG. 4B, and FIG. 5), an openable cover side positioning member 222d, and a side cover side positioning member 222e (see FIG. 4A and FIG. 5A).

The feed side positioning member 222c, the openable cover side positioning member 222d, and the side cover side positioning member 222e position the sheets P to P, through restriction of the movement of the sheets P to P, placed on the stacking tray 221, in the sheet feed direction Y1 and in the opposite direction Y2 opposite to the sheet feed direction Y1.

The feed side positioning member 222c forms the side wall 202c provided on the feed side of the sheet P with respect to the pair of inner walls 202a and 202b. The openable cover side positioning member 222d and the side cover side positioning member 222e are provided in a center portion in the depth direction X while being split to be provided on the inner surface of the openable cover 201 and on the inner surface of a side cover 203 (see FIG. 4A and FIG. 5A). The shape of the openable cover 201, corresponding to the opening/closing member according to the present invention, is not limited to that illustrated in the figure. The side surface cover 203 may be any casing side member provided on a lower portion of the openable cover 201, and is not limited to a cover shape in side view.

In this example, the openable cover side positioning member 222d and the side cover side positioning member 222e are provided with the positioning position being adjustable on one side (the sheet feed direction Y1) in the left and right direction Y, in accordance with the sheet P of various sizes (more specifically, the A4 size, the B5 size, letter size, or the like).

The stacking tray 221 is provided with insertion holes 221c and 221d through which the front side positioning member 222a and the back side positioning member 222b are inserted. The insertion holes 221c and 221d have a predetermined size in the left and right direction Y slightly larger than the size of the front side positioning member 222a and the back side positioning member 222b in the left and right direction Y (by a predetermined distance large enough to achieve smooth movement of the front side positioning member 222a and the back side positioning member 222b in the insertion holes 221c and 221d). The insertion holes 221c and 221d have a predetermined size in the depth direction X for adjusting positioning of the front side positioning member 222a and the back side positioning member 222b in the depth direction X.

(Openable Cover)

The openable cover 201 is provided to the casing 202 in an openable manner and covers the stacking tray 221 while being in a closed state. The openable cover 201 is provided to a side surface (in this example, the right side surface 2022) of the casing 202 on one side in the left and right direction Y. The openable cover 201 is supported by the casing 202 in an openable manner. The openable cover 201 is openable and closable around a rotational axis along a positioning direction (in this example, the depth direction X) for positioning the sheet P with the positioning member 222 (in this example, the front side positioning member 222a and the back side positioning member 222b). A horizontal direction indicated by an arrow Y in FIGS. 3 to 5 corresponds to an opening/closing direction of the openable cover 201.

More specifically, rotational shafts 201a and 201a (see FIG. 3B, FIG. 4B and FIG. 5B) protruding outward in the depth direction X are provided to both end portions of the openable cover 201 in the depth direction X. The rotational shafts 201a and 201a serve as swinging fulcrums in the present invention and are rotatably inserted in rotation holes (not illustrated) provided to the pair of inner walls 202a and 202b of the casing 202. A pair of rotation restriction members 204 and 204 (see FIG. 4A and FIG. 5A) are provided between the openable cover 201 and the pair of inner walls 202a and 202b of the casing 202. The pair of rotation restriction members 204 and 204 prevent the openable cover 201 from rotating over a predetermined full open angle corresponding to a full open state of the openable cover 201. Thus, the full open state (see FIG. 5) is maintained with the rotation of the openable cover 201 over the full open angle prevented by the pair of rotation restriction members 204 and 204.

(Pair of Feed Rollers)

The pair of feed rollers 211b and 211c feed the sheets P stacked on the stacking tray 221, and lifted up to a predetermined sheet feed position by the lifting/lowering device, in the predetermined sheet feed direction Y1.

(Conveyance Roller)

The conveyance roller 211e is disposed further on the downstream side than the pair of feed rollers 211b and 211c in the sheet feed direction Y1, and feeds the sheet P, conveyed thereto by the pair of feed rollers 211b and 211c, to the image forming apparatus main body 110.

First Embodiment

Figure 6:
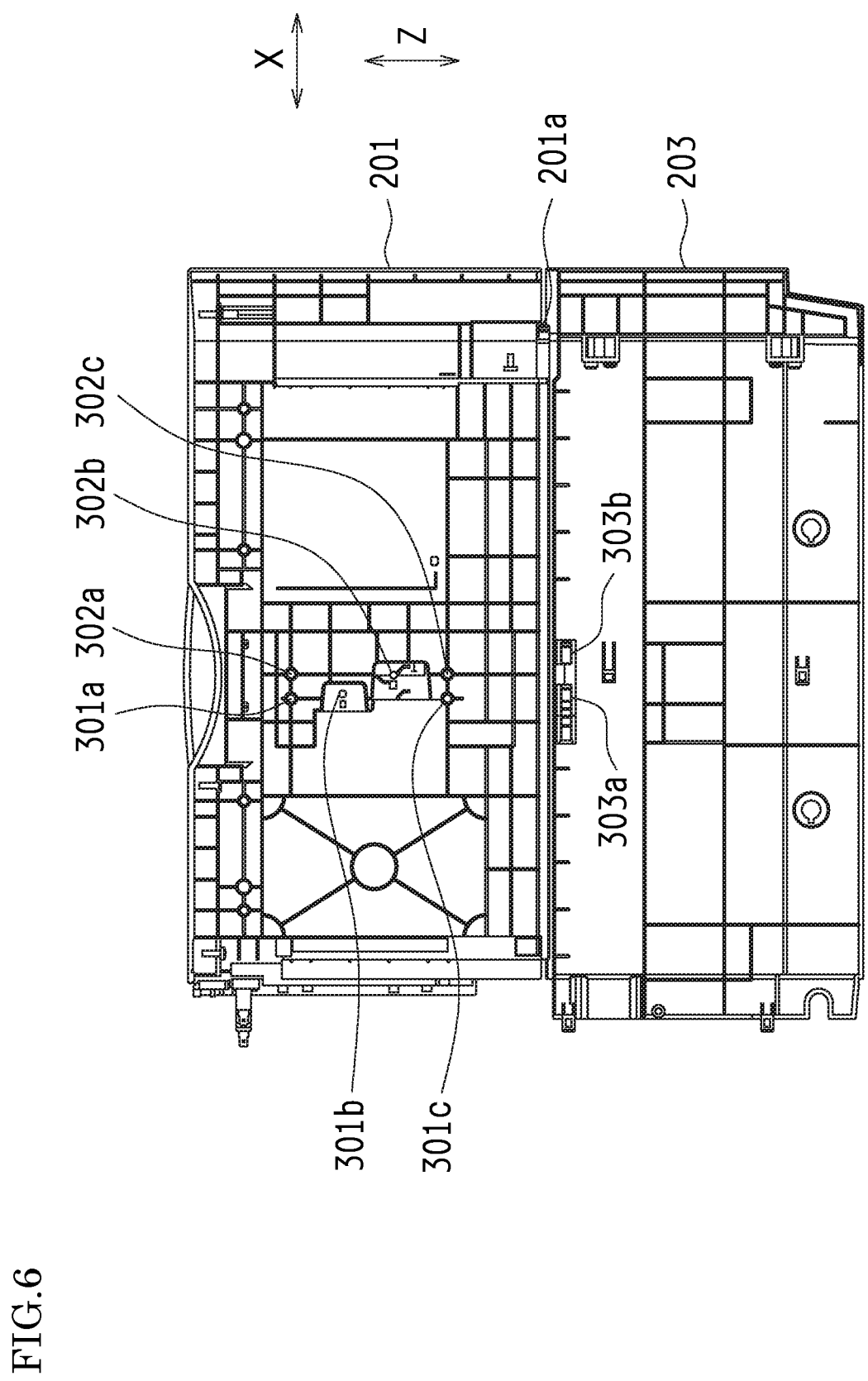
FIG. 6 is a plan view illustrating inner surfaces of an openable cover 201 and a side surface cover 203.

FIG. 6 is a plan view illustrating inner surfaces of the openable cover 201 and the side surface cover 203 according to a first embodiment of the present invention. The inner surface of the openable cover 201 is provided with fixing screw holes 301a to 301c and 302a to 302c for fixing the openable cover side position restricting member 222d. The inner surface of the of the side surface cover 203 is provided with engagement portions 303a and 303b with which the side surface cover side position restricting member 222e is fixed.

In an example illustrated in FIG. 6, the fixing screw holes 301a and 301c are at the same position in the depth direction X and are at different positions in the upper and lower direction Z. The fixing screw holes 302a and 302c are at the same position in the upper and lower direction Z and are at different positions in the depth direction X. The fixing screw hole 301b is at position different from those of the other fixing screw holes 301a, 301c, and 302a to 302c in the depth direction X and in the upper and lower direction Z. The fixing screw hole 302b is at a position that is the same as those of the fixing screw holes 302a and 302c in the depth direction X, and different from those of the fixing screw holes 302a and 302c in the upper and lower direction Z. The inner surface of the openable cover 201 is provided with character patterns, corresponding to the sheet sizes, near the fixing screw hole 301a to 301c and 302a to 302c.

Figure 7:
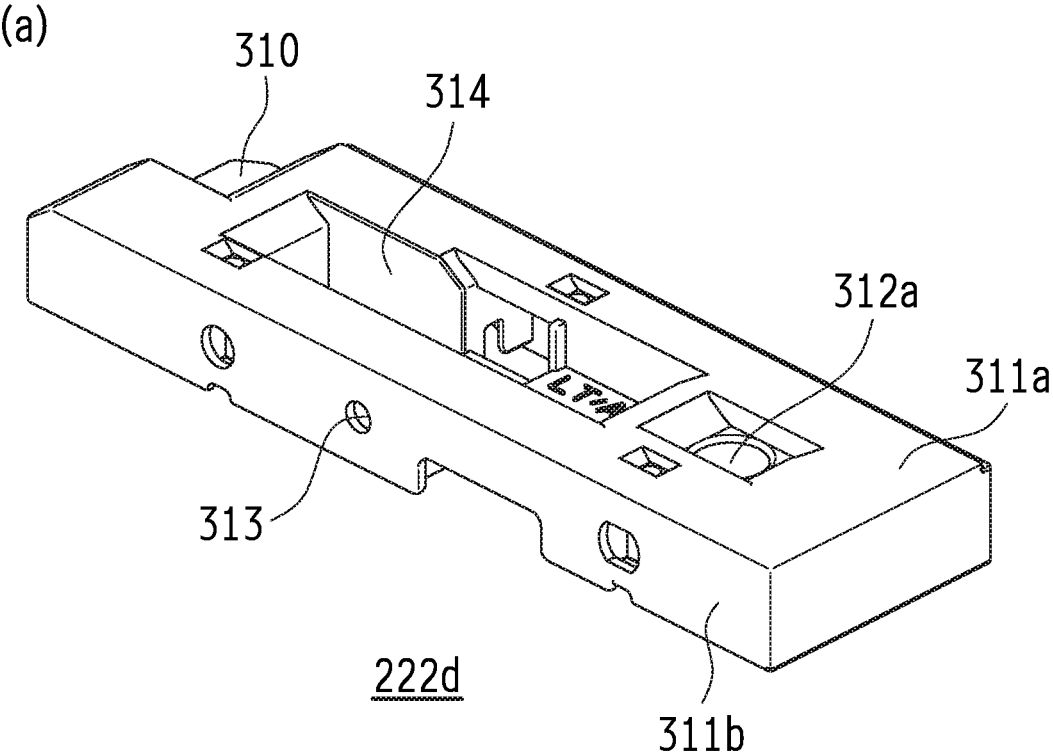
Figure 7:
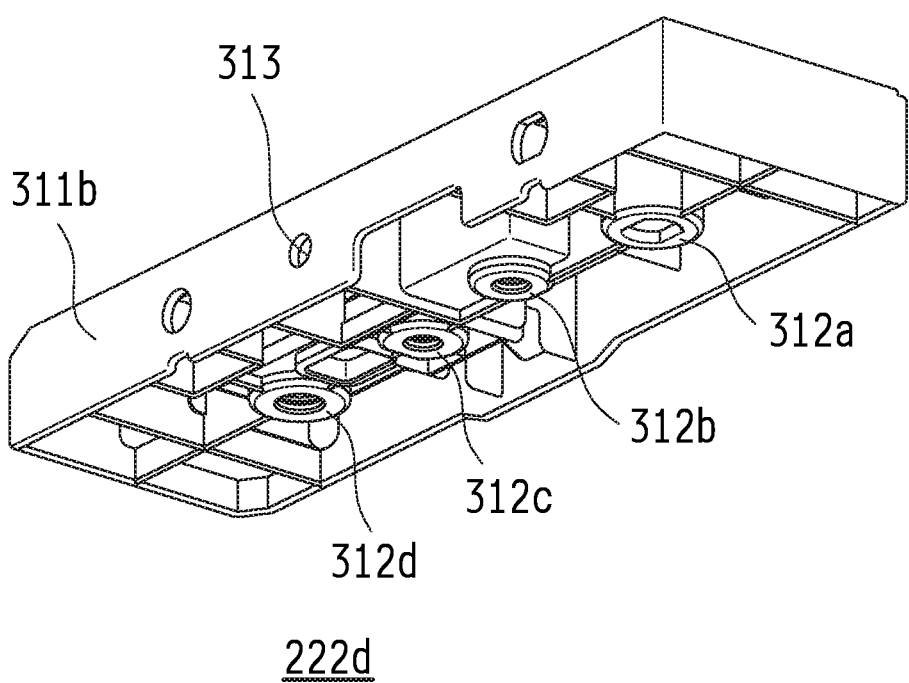

FIG. 7 is an outer perspective view of the openable cover side position restricting member 222d, in which FIG. 7A is an upper perspective view, and FIG. 7B is a lower perspective view. As illustrated in FIG. 7, the openable cover side position restricting member 222d has a substantially rect-angular-parallelepiped shape that is partially recessed to have a recess portion 310. The openable cover side position restricting member 222d has three surfaces in the longitudinal direction serving as a first restricting portion 311a, a first attachment surface 311b, and a second restricting portion 311c (see FIGS. 13 and 14).

The first restricting portion 311a has a back surface side provided with a plurality of bosses with a protruding shape, and has a bottom portion provided with a plurality of screw holes 312a to 312d. Thus, a distance substantially corresponding to the width of the first attachment surface 311b is ensured between the screw holes 312a to 312d and the first restricting portion 311a. The first attachment surface 311b is also provided with a screw hole 313. A distance substantially corresponding to the width of the first restricting portion is ensured between the screw hole 313 and the second restricting portion 311c. The screw holes 312a to 312d correspond to a first attachment position according to the present invention, and the screw hole 313 corresponds to a second attachment position according to the present invention.

Figure 8:
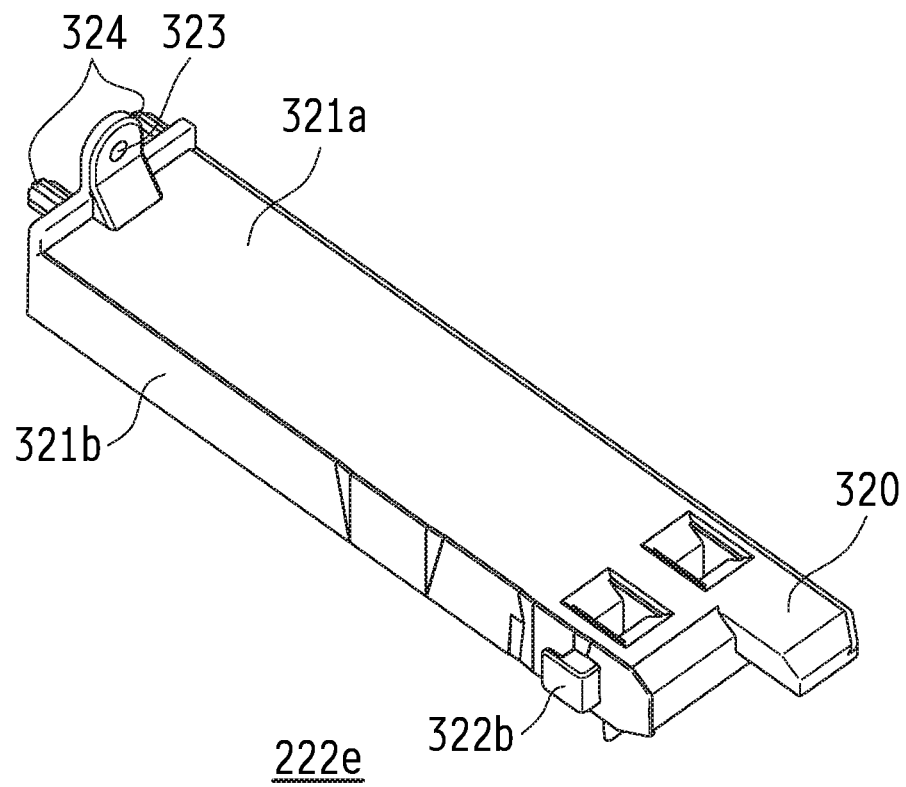
Figure 8:
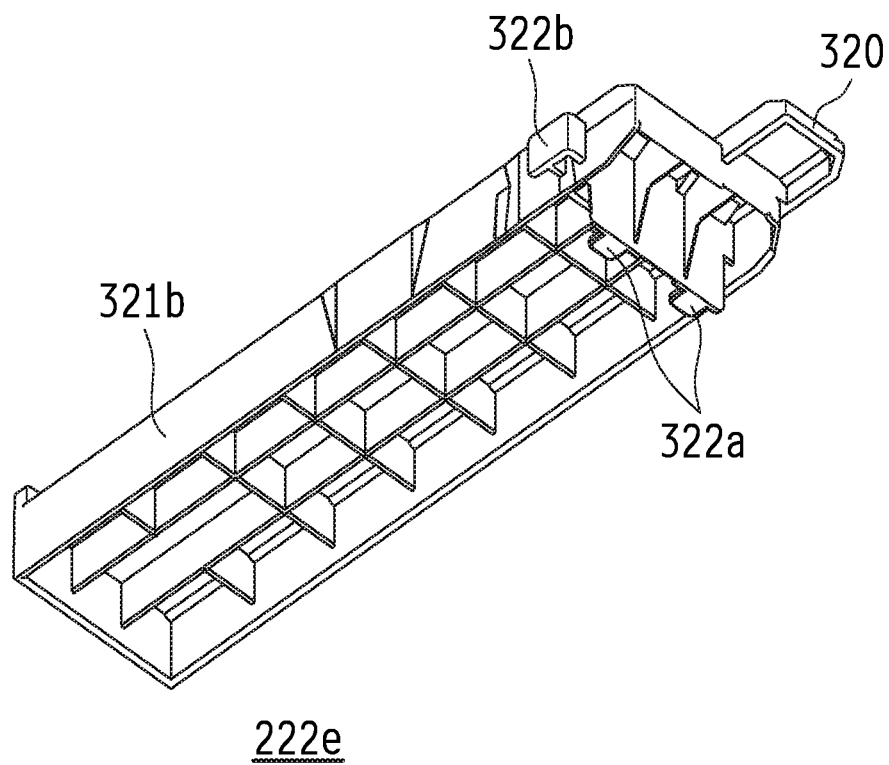

FIG. 8 is an outer perspective view of the side surface cover side position restricting member 222e, in which FIG. 8A is an upper perspective view, and FIG. 8B is a lower perspective view. As illustrated in FIG. 8, the side surface cover side position restricting member 222e has a substantially rectangular-parallelepiped shape that is partially protruded to have a protruding portion 320. The side surface cover side position restricting member 222e has three surfaces in the longitudinal direction serving as a third restriction portion 321a, a second attachment surface 321b, and a fourth restriction portion 321c (see FIGS. 13 and 14).

The third restriction portion 321a has a back surface side provided with an engagement piece 322a for attachment to the side surface cover 203, and the second attachment surface 321b is also provided with an engagement piece 322b for the attachment to the side surface cover 203. The side surface cover side position restricting member 222e has a lower end provided with a screw hole 323, for attachment to the bottom surface of the casing 202, and a positioning protrusion 324. The positions where the fixing screw holes 301a to 301c and 302a to 302c are formed, as well the shapes of the openable cover side position restricting member 222d and the side surface cover side position restricting member 222e are not limited to those illustrated in FIGS. 6 to 8, and may be designed as appropriate. The openable cover side position restricting member 222d may be provided with the protruding portion 320, and the side surface cover side position restricting member 222e may be provided with the recess portion 310.

Figure 9:
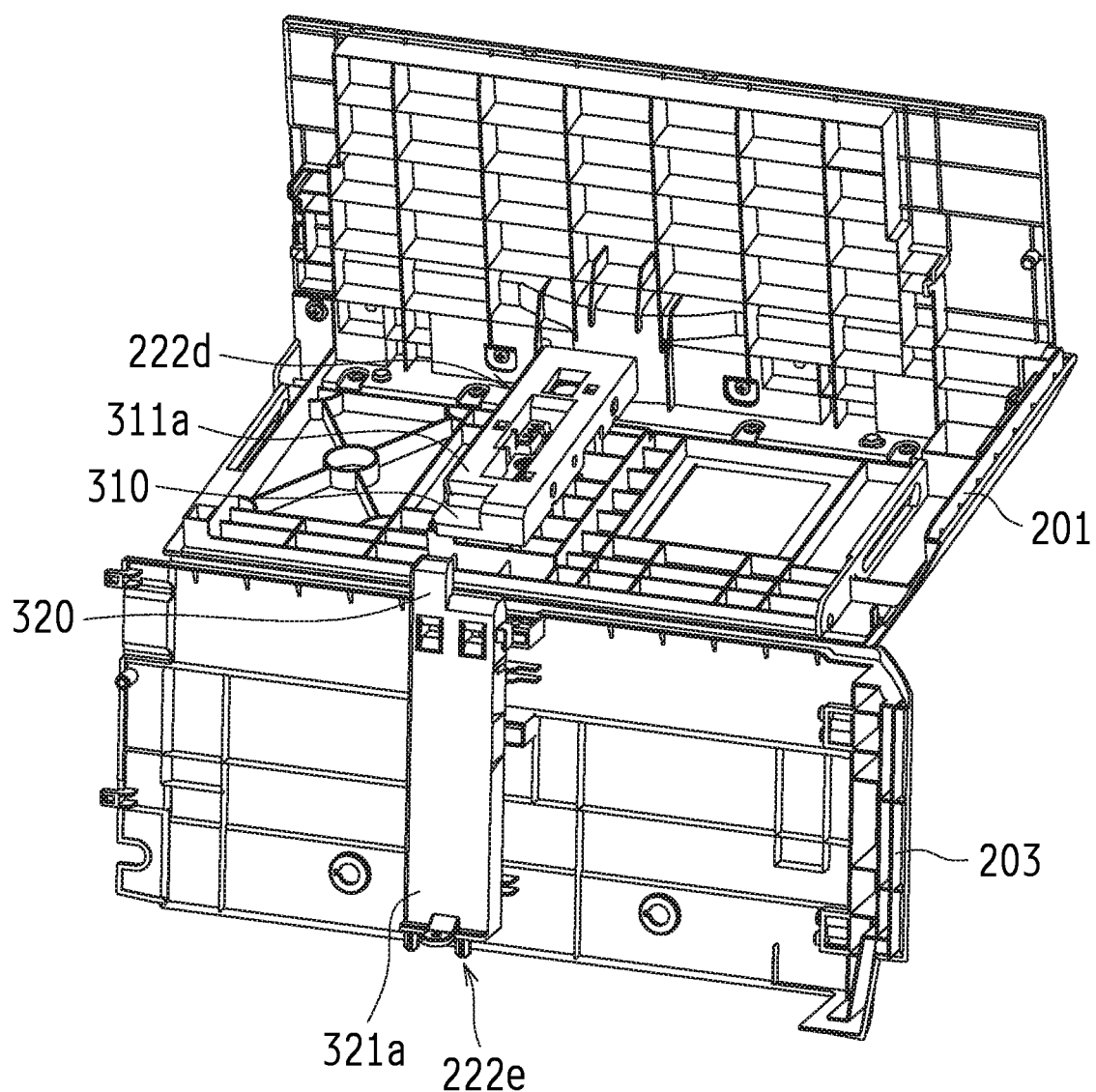
FIG. 9 is a perspective view illustrating a state where the openable cover 201 is open with the openable cover side position restricting member 222d and the side surface cover side position restricting member 222e attached to A4 size sheet positions.
Figure 10:
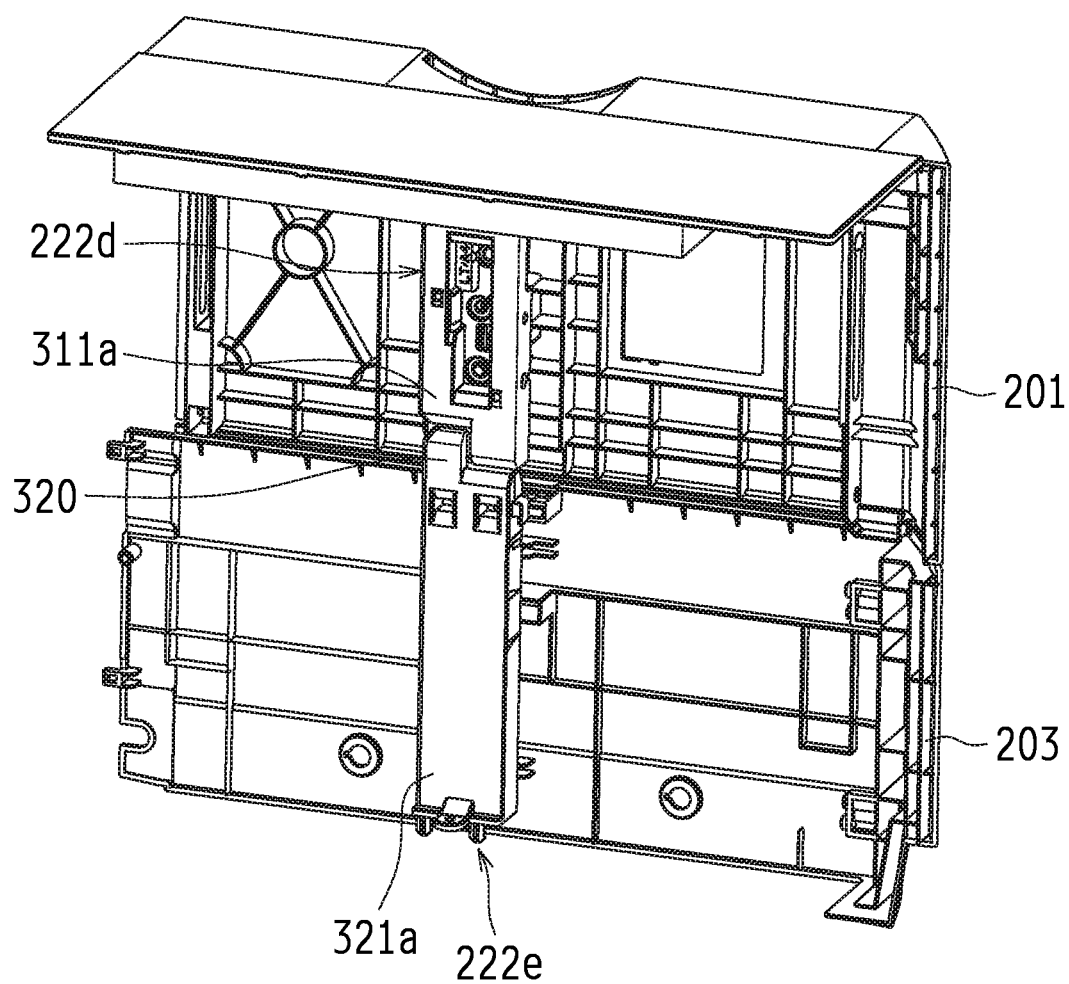
FIG. 10 is a perspective view illustrating a state where the openable cover 201 is closed with the openable cover side position restricting member 222d and the side surface cover side position restricting member 222e attached to the A4 size sheet positions.

FIG. 9 is a perspective view illustrating a state where the openable cover 201 is open with the openable cover side position restricting member 222d and the side surface cover side position restricting member 222e attached to A4 size sheet positions. FIG. 10 is a perspective view illustrating a state where the openable cover 201 is closed with the openable cover side position restricting member 222d and the side surface cover side position restricting member 222e attached to the A4 size sheet positions.

When the sheets P of the A4 size are to be stacked on the stacking tray 221, the screw holes 312a, 312b, and 312d of the openable cover side position restricting member 222d are positioned at and screwed in the fixing screws hole 301a to 301c illustrated in FIG. 6. The engagement piece 322a of the side surface cover side position restricting member 222e is engaged with the engagement portion 303a illustrated in FIG. 6, and the positioning protrusion 324 and the screw hole 323 are positioned at a positioning hole (not illustrated) and a screw hole formed in the bottom surface of the casing 202, and fixing is achieved with a screw. The mechanism described above employs the screwing using the screw for detachably attaching the openable cover side position restricting member 222d and the side surface cover side position restricting member 222e. Alternatively, any other mechanism that can achieve the fixing and detachable attachment may be employed.

When the openable cover 201 in the open state rotates about the rotational shaft 201a, serving as the swinging fulcrum, illustrated in FIG. 4B to be closed, the openable cover side position restricting member 222d and the side surface cover side position restricting member 222e are positioned on the same straight line along the stacking direction as illustrated in FIG. 10. The protruding distance of the first restricting portion 311a from the openable cover 201 is determined in accordance with the distance between the screw holes 312a to 312d as the first attachment position and the first restricting portion 311a, and the first restricting portion 311a is substantially flush with the third restriction portion 321a. In the state where the openable cover 201 is closed, the first restricting portion 311a and the third restriction portion 321a face the inside of the casing 202, and are in contact with a trailing end portion of the stacked sheets P in the opening and closing direction. Thus, the sheet P is positioned with the movement in the Y direction restricted.

As illustrated in FIG. 10, when the openable cover 201 is closed, the recess portion 310 is positioned to be covered by the protruding portion 320 in an overlapping manner. When the protruding portion 320 covers the recess portion 310, a part of the third restriction portion 321a extending to the protruding portion 320 is arranged adjacent to a part of the first restricting portion 311a in a horizontal direction. Thus, a crank shaped joint is provided between the first restricting portion 311a and the third restriction portion 321a, whereby a gap, extending in a horizontal direction, is not formed between the openable cover side position restricting member 222d and the side surface cover side position restricting member 222e. Thus, the openable cover side position restricting member 222d and the side surface cover side position restricting member 222e can be in contact with the trailing end side of the sheet P with no risk of sheet disturbance due to the sheet P entering between the gap therebetween.

Second Embodiment

Figure 11:
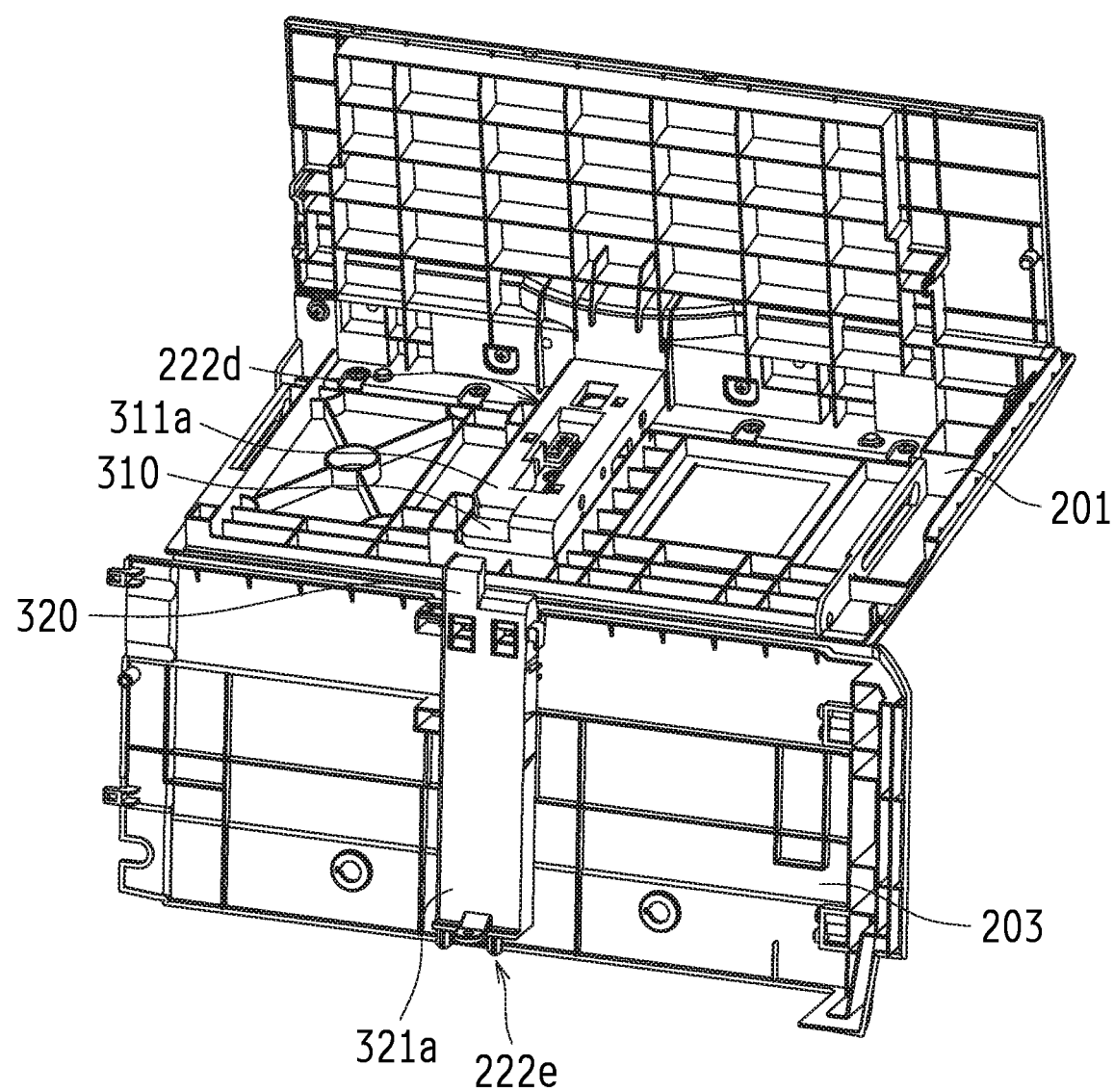
FIG. 11 is a perspective view illustrating a state where the openable cover 201 is open with the openable cover side position restricting member 222d and the side surface cover side position restricting member 222e attached to B5 size sheet positions.
Figure 12:
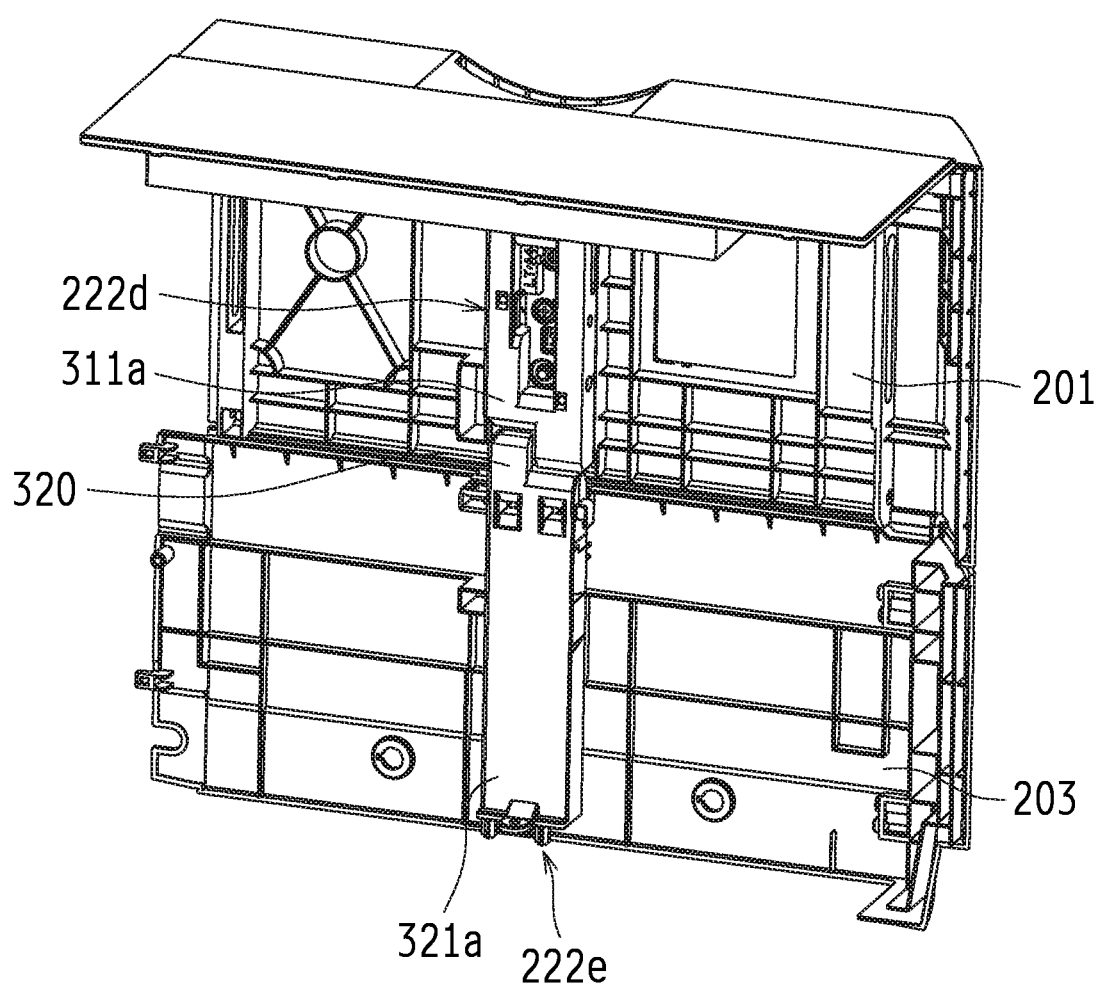
FIG. 12 is a perspective view illustrating a state where the openable cover 201 is closed with the openable cover side position restricting member 222d and the side surface cover side position restricting member 222e attached to the B5 size sheet positions.

Next, how the sheet size of the sheets P stacked on the stacking tray 221 is changed to a B5 size is described with reference to FIGS. 11 and 12. FIG. 11 is a perspective view illustrating a state where the openable cover 201 is open with the openable cover side position restricting member 222d and the side surface cover side position restricting member 222e attached to B5 size sheet positions. FIG. 12 is a perspective view illustrating a state where the openable cover 201 is closed with the openable cover side position restricting member 222d and the side surface cover side position restricting member 222e attached to the B5 size sheet positions.

When the sheets P of the B5 size are to be stacked on the stacking tray 221, the screw holes 312a, 312c, and 312d of the openable cover side position restricting member 222d are positioned at and screwed in the fixing screws hole 302a to 302c illustrated in FIG. 6. The engagement piece 322a of the side surface cover side position restricting member 222e is engaged with the engagement portion 303b illustrated in FIG. 6, and the positioning protrusion 324 and the screw hole 323 are positioned at a positioning hole (not illustrated) and a screw hole formed in the bottom surface of the casing 202, and fixing is achieved with a screw.

The positions where the openable cover side position restricting member 222d and the side surface cover side position restricting member 222e are disposed for the B5 size are different from those for the A4 size described above in the width direction of the sheet P.

In this case of achieving the B5 size position, as in the case of the A4 size, when the openable cover 201 is closed, the openable cover side position restricting member 222d and the side surface cover side position restricting member 222e are positioned on the same straight line along the stacking direction of the side surface cover side position restricting member 222e, and the first restricting portion 311a is substantially flush with the third restriction portion 321a. The first restricting portion 311a and the third restriction portion 321a are in contact with the trailing end portion of the stacked sheets P in the opening and closing direction. Thus, the sheet P is positioned with the movement in the Y direction restricted. When the openable cover 201 is in the closed state, the recess portion 310 is positioned to be covered by the protruding portion 320 in an overlapping manner.

With the openable cover side position restricting member 222d and the side surface cover side position restricting member 222e positioned and detachably attached to the openable cover 201 and the side surface cover 203 as described above, the positioning of the sheet P can be achieved for a plurality of sheet sizes.

Third Embodiment

Figure 13:
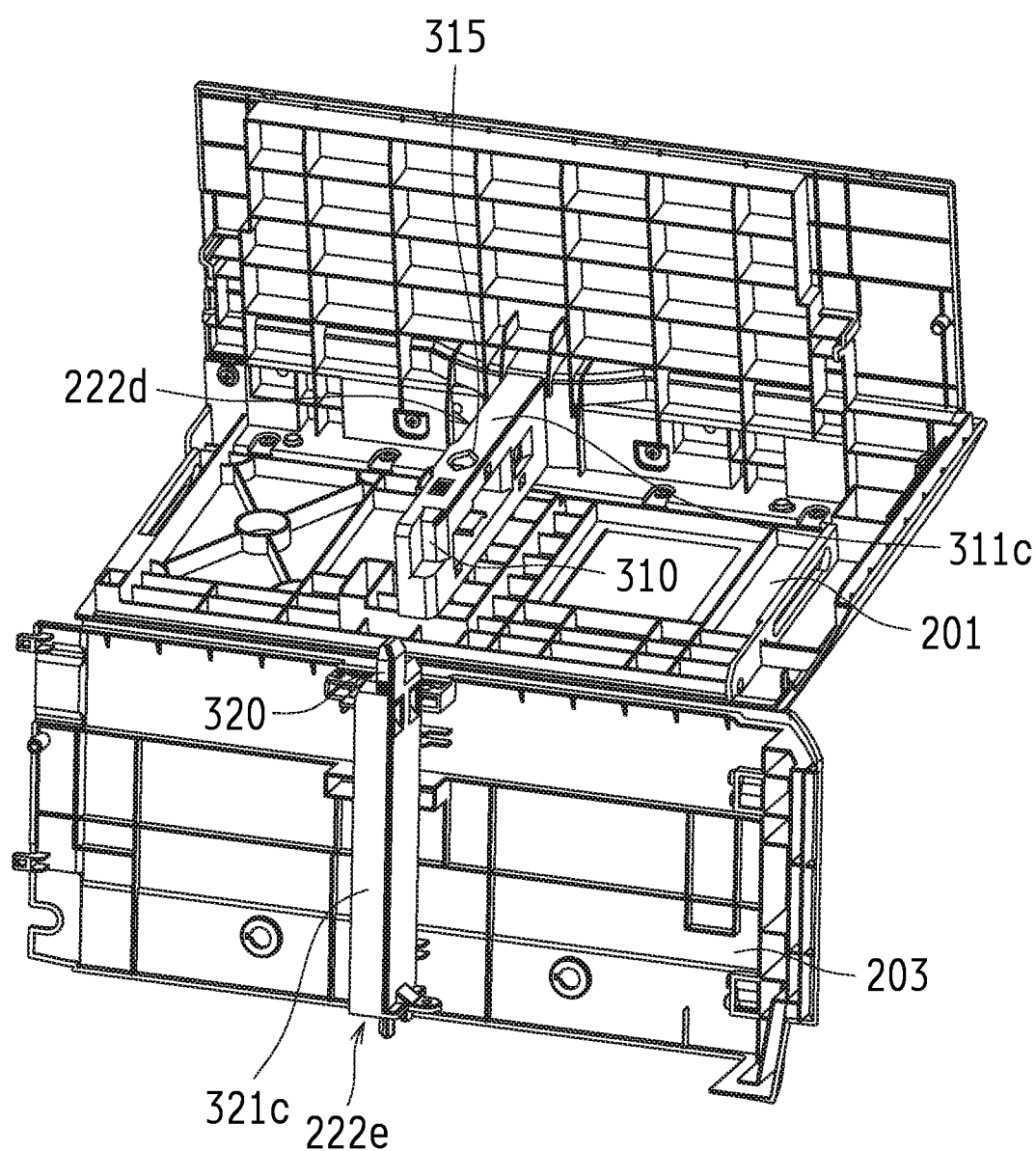
FIG. 13 is a perspective view illustrating a state where the openable cover 201 is open with the openable cover side position restricting member 222d and the side surface cover side position restricting member 222e attached to letter size sheet positions.
Figure 14:
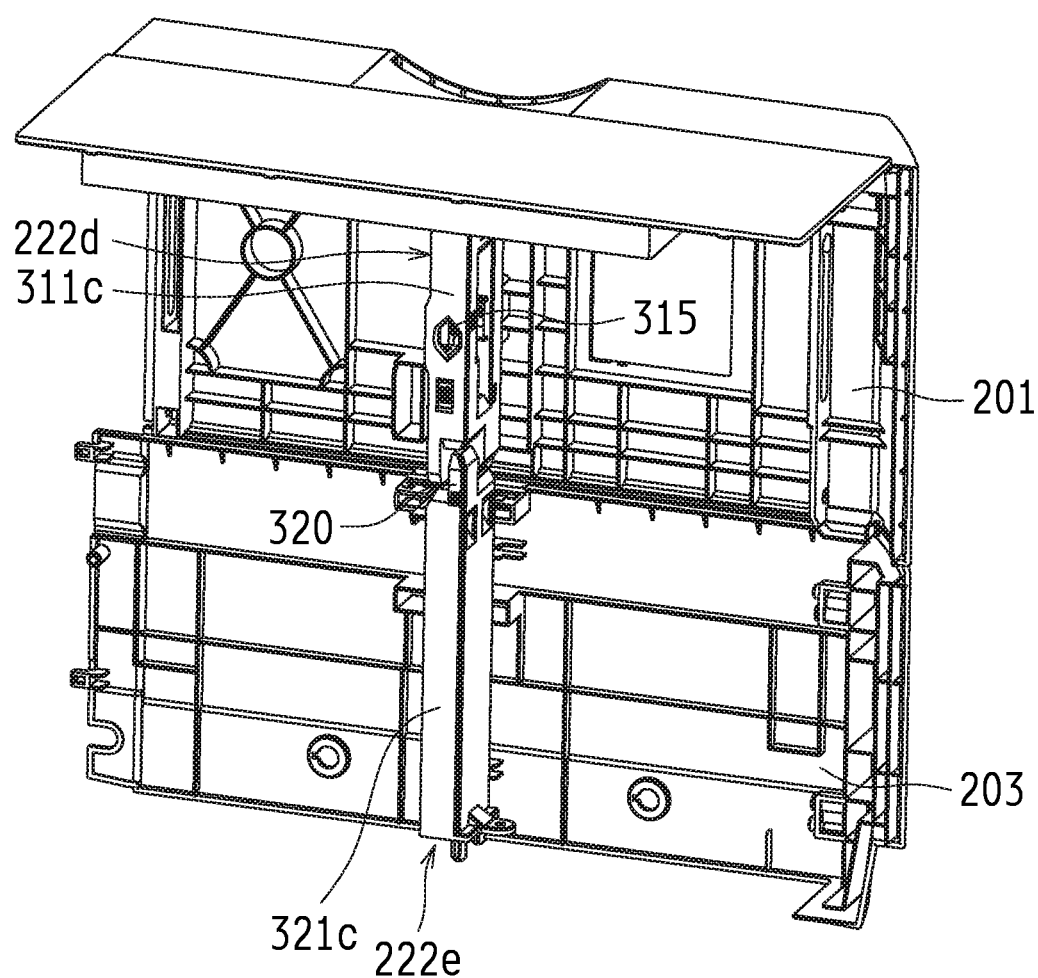
FIG. 14 is a perspective view illustrating a state where the openable cover 201 is closed with the openable cover side position restricting member 222d and the side surface cover side position restricting member 222e attached to the letter size sheet positions.

Next, how the sheet size of the sheets P stacked on the stacking tray 221 is changed to a letter size is described with reference to FIGS. 13 and 14. FIG. 13 is a perspective view illustrating a state where the openable cover 201 is open with the openable cover side position restricting member 222d and the side surface cover side position restricting member 222e attached to letter size sheet positions. FIG. 14 is a perspective view illustrating a state where the openable cover 201 is closed with the openable cover side position restricting member 222d and the side surface cover side position restricting member 222e attached to the letter size sheet positions.

When the sheets P of the letter size are to be stacked on the stacking tray 221, the screw hole 313 is positioned at and screwed in the fixing screw hole 302b illustrated in FIG. 6, with the first attachment surface 311b of the openable cover side position restricting member 222d facing the inner surface of the openable cover 201. The second restricting portion 311c of the openable cover side position restricting member 222d has an opening 315 formed at a position facing the screw hole 313. Screwing to the screw hole 313 and the fixing screw hole 302b can be achieved from the back side of the first attachment surface 311b with a screw and a tool inserted through the opening 315.

The positioning protrusion 324 and the screw hole 323 are positioned at the positioning hole (not illustrated) and the screw hole formed on the bottom surface of the casing 202 and the fixing is archived by using screws, with the second attachment surface 321b of the side surface cover side position restricting member 222e facing the inner surface of the side surface cover 203 and the engagement piece 322a engaged with the engagement portion 303b illustrated in FIG. 6.

In the case of achieving the letter size position, when the openable cover 201 is open, the openable cover side position restricting member 222d and the side surface cover side position restricting member 222e are positioned on the same straight line along the stacking direction of the side surface cover side position restricting member 222e, and the second restricting portion 311c is substantially flush with the restriction member 321c. When the openable cover 201 is closed, the second restricting portion 311c and the fourth restriction portion 321c each face the inside of the casing 202, and are in contact with the trailing end portion of the stacked sheets P in the opening and closing direction. Thus, the sheet P is positioned with the movement in the Y direction restricted.

The positions where the openable cover side position restricting member 222d and the side surface cover side position restricting member 222e are disposed for the letter size are different from those for the B5 size described above in the width direction of the sheet P. Still, as illustrated in FIG. 7, the distance between the screw hole 312a to 312d as the first attachment position and the first restricting portion 311a is different from the distance between the screw hole 313 as the second attachment position and the second restricting portion 311c. Thus, the sheet P of the letter size can be positioned by the first restricting portion 311a and the third restriction portion 321a in contact with the trailing end of the sheet P, with the second restricting portion 311c and the fourth restriction portion 321c protruding beyond the openable cover 201 and the side surface cover 203 by a distance larger than those in the cases of the A4 size and the B5 size.

When the openable cover 201 is in the closed state, the recess portion 310 is positioned to be covered by the protruding portion 320 in an overlapping manner. When the protruding portion 320 covers the recess portion 310, a part of the fourth restriction portion 321c extending to the protruding portion 320 is arranged adjacent to a part of the second restricting portion 311c in a horizontal direction, in the case where the letter size is achieved. Thus, a crank shaped joint is provided between second restricting portion 311c and the fourth restriction portion 321c, whereby a gap, extending in a horizontal direction, is not formed between the openable cover side position restricting member 222d and the side surface cover side position restricting member 222e. Thus, the openable cover side position restricting member 222d and the side surface cover side position restricting member 222e can be in contact with the trailing end side of the sheet P with no risk of sheet disturbance due to the sheet P entering between the gap therebetween.

As described in the first embodiment to the third embodiment, when the openable cover 201 is in the open state, the openable cover side position restricting member 222d is pulled away together with the inner surface of the openable cover 201 so as not to be disposed in an upper portion of the side surface cover 203, as illustrated in FIG. 9. Thus, the sheet supplying operation can be performed with a higher operability, with the sheet P not interfering with the openable cover side position restricting member 222d while being provided on the stacking tray 221 with the openable cover 201 open, regardless of the sheet size.

The side surface cover side position restricting member 222e is attached to the inner side of the side surface cover 203 when the openable cover 201 is open. More specifically, when the stacking tray 221 is positioned below the rotational shaft 201a with a predetermined amount of the sheets P or more stacked thereon, the side surface cover side position restricting member 222e is in contact with the trailing end surface of the stacked sheets P at the lower portion. All things considered, the position of the stacked sheets P at the lower portion can be restricted regardless of whether the openable cover 201 is open or closed, whereby the sheet disturbance can be prevented.

Fourth Embodiment

When the sheet P is supplied in the sheet feed device 200, the openable cover 201 rotates about the rotational shaft 201a to be opened. The sheet feed device 200 detects that the openable cover 201 is open, and lowers the stacking tray 221 down to a position at which the upper surface of the stacking tray 221 or the upper surface of the uppermost one of the stacked sheets P matches a position indicated by an arrow Q2 in FIG. 4B and maintains the stacking tray 221 at the position. The stopped position Q2 is positioned higher than the rotational shaft 201a, and the uppermost portion of the side surface cover side position restricting member 222e is positioned lower than the upper surface of the stacking tray 221 or the upper surface of the uppermost one of the stacked sheet P. The sheet supplying operation can be performed with a higher operability, with the upper surface of the stacking tray 221 or the upper surface of the uppermost one of the stacked sheet P thus positioned above the uppermost portion of the side surface cover side position restricting member 222e when the sheets P are supplied.

Other Embodiments

The sheet feed device 200, which is a large capacity paper feed device in the present embodiment, may be any device in which the sheets P, stacked on the stacking tray 221 and lifted to the sheet feed position by the lifting/lowering device, can be fed in the sheet feed direction Y1 with the pair of supply rollers 211b and 211c. For example, the sheet feed device 200 may be provided in the image forming apparatus main body 110.

The present invention is not limited to the embodiments described above, and can be embodied in various other forms. The embodiments are given by way of example in any way and should not be interpreted in a limiting sense. The scope of the present invention is defined on the basis of the scope of the appended claims, and is not restricted by the other parts of the present application in any way. The present invention includes all changes and modifications that fall within the scope of the appended claims and equivalents thereof.

REFERENCE SIGNS LIST 100 image forming apparatus
120 control unit
121 processing unit
122 storage unit
200 sheet feed device
201 openable cover
201a rotational shaft
201b uppermost portion
202 casing
2021 front surface
2022 right side surface
2023 notched portion
2023a upper side
2023b side edge
203 side cover
210 sheet feed unit
211a pickup rollers
211b first supply roller
211c second supply roller
211e conveyance roller
221 stacking tray
2211 sheet stacking surface
222 positioning member
2221 openable cover side end
222a front side positioning member
222b back side positioning member
222d openable cover side position restricting member
222e side surface cover side position restricting member
301a, 301b, 302a, 302b fixing screw hole
303a, 303b engagement portion
310 recess portion
320 protruding portion
311a first restricting portion
311b first attachment surface
311c second restricting portion

315 opening
321*a* third restriction portion
321*b* second attachment surface
321*c* fourth restriction portion
322*a*, 322*b* engagement piece

What is claimed is:

1. A sheet feed device comprising:
   a stacking tray on which sheets are stacked in such a manner as to be capable of being lifted and lowered; and
   a plurality of position restricting members configured to restrict a position of the sheets, and
   a casing side member on a lower portion of an opening/closing member, wherein the plurality of position restricting members comprise:
   a first position restricting member provided to the opening/closing member capable of being opened and closed with respect to a main body of the sheet feed device so as to make it possible to restrict the position of the sheets by being in contact with a trailing edge portion of the sheets, the trailing edge portion being perpendicular to an upper surface of an uppermost one of the stacked sheets; and
   a second position restricting member provided to the main body of the sheet feed device so as to make it possible to restrict the position of the sheets by being in contact with the trailing edge portion of the sheets,
   wherein when the opening/closing member is closed, the first position restricting member and the second position restricting member restrict the position of the trailing edge portion of the sheets in an opening/closing direction of the opening/closing member,
   wherein the second position restricting member is provided to the casing side member,
   wherein the first position restricting member includes: a first restricting portion configured to restrict a sheet of a first size; and a second restricting portion configured to restrict a sheet of a second size,
   wherein the first position restricting member is detachably attached to the opening/closing member and has a substantially rectangular parallelepiped shape, and
   wherein the first restricting portion and the second restricting portion are substantially orthogonal to each other.

2. The sheet feed device according to claim 1, wherein when the opening/closing member is closed, the first position restricting member and the second position restricting member are positioned along a stacking direction of the sheets.

3. The sheet feed device according to claim 1, wherein when the opening/closing member is closed, the first position restricting member and the second position restricting member are positioned on a same straight line in a stacking direction of the sheets.

4. The sheet feed device according to claim 1,
   wherein the first position restricting member includes a recess portion and the second position restricting member includes a protruding portion, the recess portion and the protruding portion having matching shapes,
   wherein when the opening/closing member is closed, the recess portion or the protruding portion of the first position restricting member is positioned at the protruding portion or the recess portion of the second position restricting member.

5. The sheet feed device according to claim 1,
   wherein the first position restricting member includes: a first attachment position attached to the opening/closing member for restricting the sheet of the first size; and a second attachment position attached to the opening/closing member for restricting the sheet of the second size,
   wherein a distance between the first attachment position and the first restricting portion is different from a distance between the second attachment position and the second restricting portion.

6. The sheet feed device according to claim 1, wherein the opening/closing member includes a plurality of engagement portions with which the first position restricting member is attached, the plurality of engagement portions being arranged in a width direction of the sheet.

7. The sheet feed device according to claim 1,
   wherein the opening/closing member is provided with a swinging fulcrum, and an operation of closing the opening/closing member causes the first position restricting member to be in contact with a trailing end side of the sheet.

8. The sheet feed device according to claim 1,
   wherein when the opening/closing member is opened, the stacking tray is lowered and stopped at a predetermined position, and
   wherein when the stacking tray is at the predetermined position, an uppermost portion of the second position restricting member is positioned lower than an upper surface of the stacking tray or the upper surface of the uppermost one of the stacked sheets.

9. An image forming apparatus comprising the sheet feed device according to claim 1.

10. The sheet feed device according to claim 1,
    wherein the first position restricting member includes a protruding portion and the second position restricting member includes a recess portion, the recess portion and the protruding portion having matching shapes,
    wherein when the opening/closing member is closed, the protruding portion of the first position restricting member is positioned at the recess portion of the second position restricting member.

* * * * *